(12) United States Patent
Mesaros

(10) Patent No.: US 8,494,915 B2
(45) Date of Patent: *Jul. 23, 2013

(54) METHOD AND COMPUTER MEDIUM FOR TRACKING SOCIAL INTERACTIONS AND TARGETING OFFERS

(75) Inventor: Gregory J. Mesaros, Tampa, FL (US)

(73) Assignee: eWinWin, Inc., Tampa, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/557,196

(22) Filed: Jul. 24, 2012

(65) Prior Publication Data

US 2012/0290395 A1   Nov. 15, 2012

Related U.S. Application Data

(63) Continuation of application No. 13/424,226, filed on Mar. 19, 2012, now Pat. No. 8,285,598, which is a continuation of application No. 12/788,513, filed on May 27, 2010, now Pat. No. 8,140,402, which is a continuation-in-part of application No. 09/922,884, filed on Aug. 6, 2001, now Pat. No. 8,290,824, which is a continuation-in-part of application No. 09/324,391, filed on Jun. 3, 1999, now abandoned, said application (Continued)

(51) Int. Cl.
*G06Q 30/00* (2012.01)
*G06F 17/30* (2006.01)

(52) U.S. Cl.
USPC ................. 705/26.1; 705/26.9; 705/27.1

(58) Field of Classification Search
USPC .............................. 705/26.1–27.2
See application file for complete search history.

(56) References Cited

U.S. PATENT DOCUMENTS 4,789,928 A   12/1988   Fujisaki
4,799,156 A   1/1989   Shavit et al.

(Continued)

FOREIGN PATENT DOCUMENTS

JP   11-184910   7/1999
WO   WO 98/21713   4/1998

(Continued)

OTHER PUBLICATIONS

"Magna Cash Cybersource Partner to Expand Online Payment Options," PR Newswire, New York, Jan. 15, 2001.

(Continued)

*Primary Examiner* — Peter Choi
*Assistant Examiner* — Kathleen G Palavecino
(74) *Attorney, Agent, or Firm* — Lewis and Roca LLP

(57) ABSTRACT

Mechanisms are provided to facilitate buying and selling products utilizing social pricing. Sellers initiate sale of a product with volume discounts for a limited time. In other words, the more people that buy a product, the lower the price for the group. Buyers have a real incentive to become prosumers that not only purchase a product but also promote purchase by others. A social pricing system brokers interaction between sellers and buyer groups, and provisions mechanisms to aid promotion of products by consumers utilizing social networks and other online activities.

23 Claims, 14 Drawing Sheets

Related U.S. Application Data

No. 09/922,884 is a continuation-in-part of application No. 09/426,063, filed on Oct. 22, 1999, now Pat. No. 7,818,212, and a continuation-in-part of application No. PCT/US00/11989, filed on May 3, 2000, and a continuation of application No. 09/342,345, filed on Jun. 29, 1999, now abandoned.

(60) Provisional application No. 60/137,583, filed on Jun. 4, 1999, provisional application No. 60/138,209, filed on Jun. 9, 1999, provisional application No. 60/139,338, filed on Jun. 16, 1999, provisional application No. 60/139,518, filed on Jun. 16, 1999, provisional application No. 60/139,519, filed on Jun. 16, 1999, provisional application No. 60/142,371, filed on Jul. 6, 1999, provisional application No. 60/160,510, filed on Oct. 20, 1999, provisional application No. 60/162,182, filed on Oct. 28, 1999, provisional application No. 60/173,409, filed on Oct. 28, 1999, provisional application No. 60/133,769, filed on May 12, 1999, provisional application No. 60/135,972, filed on May 26, 1999, provisional application No. 60/133,769, filed on May 12, 1999, provisional application No. 60/237,474, filed on Oct. 2, 2000, provisional application No. 61/183,390, filed on Jun. 2, 2009, provisional application No. 61/230,248, filed on Jul. 31, 2009.

(56) References Cited

U.S. PATENT DOCUMENTS

| | | | |
|---|---|---|---|
| 4,887,207 | A | 12/1989 | Natarajan |
| 4,947,028 | A | 8/1990 | Gorog |
| 4,992,940 | A | 2/1991 | Dworkin |
| 5,053,956 | A | 10/1991 | Donald et al. |
| 5,053,957 | A | 10/1991 | Suzuki |
| 5,063,506 | A | 11/1991 | Brockwell et al. |
| 5,402,336 | A | 3/1995 | Spiegelhoff et al. |
| 5,414,838 | A | 5/1995 | Kolton et al. |
| 5,444,630 | A | 8/1995 | Dlugos |
| 5,564,115 | A | 10/1996 | Clarkson |
| 5,592,375 | A | 1/1997 | Salmon et al. |
| 5,615,109 | A | 3/1997 | Eder |
| 5,623,660 | A | 4/1997 | Josephson |
| 5,664,115 | A | 9/1997 | Fraser |
| 5,689,652 | A | 11/1997 | Lupien et al. |
| 5,710,887 | A | 1/1998 | Chelliah et al. |
| 5,717,989 | A | 2/1998 | Tozzoli et al. |
| 5,732,400 | A | 3/1998 | Mandler et al. |
| 5,734,890 | A | 3/1998 | Case et al. |
| 5,794,207 | A | 8/1998 | Walker et al. |
| 5,797,127 | A | 8/1998 | Walker et al. |
| 5,822,736 | A | 10/1998 | Hartman et al. |
| 5,826,244 | A | 10/1998 | Huberman |
| 5,835,896 | A | 11/1998 | Fisher et al. |
| 5,837,071 | A | 11/1998 | Andersson et al. |
| 5,842,178 | A | 11/1998 | Giovannoli |
| 5,845,265 | A | 12/1998 | Woolston |
| 5,850,442 | A | 12/1998 | Muftic |
| 5,870,721 | A | 2/1999 | Norris |
| 5,878,400 | A | 3/1999 | Carter, III |
| 5,884,271 | A | 3/1999 | Pitroda |
| 5,890,138 | A | 3/1999 | Godin et al. |
| 5,897,620 | A | 4/1999 | Walker et al. |
| 5,903,830 | A | 5/1999 | Joao et al. |
| 5,923,741 | A | 7/1999 | Wright et al. |
| 5,933,817 | A | 8/1999 | Hucal |
| 5,940,807 | A | 8/1999 | Purcell |
| 5,945,653 | A | 8/1999 | Walker et al. |
| 5,950,172 | A | 9/1999 | Klingman |
| 5,960,411 | A | 9/1999 | Hartman et al. |
| 5,966,697 | A | 10/1999 | Fergerson et al. |
| 5,970,478 | A | 10/1999 | Walker et al. |
| 5,974,396 | A | 10/1999 | Anderson et al. |
| 5,974,406 | A | 10/1999 | Bisdikian et al. |
| 5,987,434 | A | 11/1999 | Libman |
| 5,995,943 | A | 11/1999 | Bull et al. |
| 5,999,915 | A | 12/1999 | Nahan et al. |
| 6,014,638 | A | 1/2000 | Burge et al. |
| 6,016,484 | A | 1/2000 | Williams et al. |
| 6,026,383 | A | 2/2000 | Ausubel |
| 6,032,136 | A | 2/2000 | Brake et al. |
| 6,035,289 | A | 3/2000 | Chou et al. |
| 6,052,670 | A | 4/2000 | Johnson |
| 6,055,519 | A | 4/2000 | Kennedy et al. |
| 6,055,573 | A | 4/2000 | Gardenswartz et al. |
| 6,064,981 | A | 5/2000 | Barni et al. |
| 6,078,906 | A | 6/2000 | Huberman |
| 6,101,484 | A | 8/2000 | Halbert et al. |
| 6,108,632 | A | 8/2000 | Reeder et al. |
| 6,108,639 | A | 8/2000 | Walker et al. |
| 6,112,185 | A | 8/2000 | Walker et al. |
| 6,112,189 | A | 8/2000 | Richard et al. |
| 6,131,087 | A | 10/2000 | Luke et al. |
| 6,141,653 | A | 10/2000 | Conklin et al. |
| 6,151,588 | A | 11/2000 | Tozzoli et al. |
| 6,154,738 | A | 11/2000 | Call |
| 6,167,383 | A | 12/2000 | Henson |
| 6,195,646 | B1 | 2/2001 | Grosh et al. |
| 6,219,653 | B1 | 4/2001 | O'Neill et al. |
| 6,233,566 | B1 | 5/2001 | Levine et al. |
| 6,236,972 | B1 | 5/2001 | Shkedy |
| 6,236,977 | B1 | 5/2001 | Verba et al. |
| 6,236,978 | B1 | 5/2001 | Tuzhilin |
| 6,249,772 | B1 | 6/2001 | Walker et al. |
| 6,253,189 | B1 | 6/2001 | Feezell et al. |
| 6,260,019 | B1 | 7/2001 | Courts |
| 6,260,024 | B1 | 7/2001 | Shkedy |
| 6,266,651 | B1 | 7/2001 | Woolston |
| 6,269,343 | B1 | 7/2001 | Pallakof |
| 6,289,348 | B1 | 9/2001 | Richard et al. |
| 6,323,894 | B1 | 11/2001 | Katz |
| 6,327,574 | B1 | 12/2001 | Kramer et al. |
| 6,332,127 | B1 | 12/2001 | Bandera et al. |
| 6,332,135 | B1 | 12/2001 | Conklin et al. |
| 6,336,105 | B1 | 1/2002 | Conklin et al. |
| 6,338,050 | B1 | 1/2002 | Conklin et al. |
| 6,360,205 | B1 | 3/2002 | Iyengar et al. |
| 6,397,208 | B1 | 5/2002 | Lee |
| 6,415,270 | B1 | 7/2002 | Rackson et al. |
| 6,418,415 | B1 | 7/2002 | Walker et al. |
| 6,418,441 | B1 | 7/2002 | Call |
| 6,449,601 | B1 | 9/2002 | Friedland et al. |
| 6,450,407 | B1 | 9/2002 | Freeman et al. |
| 6,456,986 | B1 | 9/2002 | Boardman et al. |
| 6,466,919 | B1 | 10/2002 | Walker et al. |
| 6,496,568 | B1 | 12/2002 | Nelson |
| 6,505,046 | B1 | 1/2003 | Baker |
| 6,507,279 | B2 | 1/2003 | Loof |
| 6,519,571 | B1 | 2/2003 | Guheen et al. |
| 6,553,346 | B1 | 4/2003 | Walker et al. |
| 6,553,350 | B2 | 4/2003 | Carter |
| 6,560,501 | B1 | 5/2003 | Walser et al. |
| 6,578,014 | B1 | 6/2003 | Murcko, Jr. |
| 6,584,451 | B1 | 6/2003 | Shoham et al. |
| 6,587,835 | B1 | 7/2003 | Treyz et al. |
| 6,598,026 | B1 | 7/2003 | Ojha et al. |
| 6,601,043 | B1 | 7/2003 | Purcell |
| 6,604,089 | B1 | 8/2003 | Van Horn et al. |
| 6,606,603 | B1 | 8/2003 | Joseph et al. |
| 6,606,607 | B1 | 8/2003 | Martin et al. |
| 6,607,136 | B1 | 8/2003 | Atsmon et al. |
| 6,631,356 | B1 | 10/2003 | Van Horn et al. |
| 6,647,257 | B2 | 11/2003 | Owensby |
| 6,647,373 | B1 | 11/2003 | Carlton-Foss |
| 6,658,093 | B1 | 12/2003 | Langseth et al. |
| 6,662,194 | B1 | 12/2003 | Joao |
| 6,705,520 | B1 | 3/2004 | Pitroda et al. |
| 6,716,101 | B1 | 4/2004 | Meadows et al. |
| 6,754,636 | B1 | 6/2004 | Walker et al. |
| 6,769,607 | B1 | 8/2004 | Pitroda et al. |

| | | |
|---|---|---|
| 6,778,968 B1 | 8/2004 | Gulati |
| 6,782,370 B1 | 8/2004 | Stack |
| 6,785,661 B1 | 8/2004 | Mandler et al. |
| 6,847,938 B1 | 1/2005 | Moore |
| 6,847,965 B2 | 1/2005 | Walker et al. |
| 6,850,907 B2 | 2/2005 | Lutnick et al. |
| 6,868,392 B1 | 3/2005 | Ogasawara |
| 6,871,140 B1 | 3/2005 | Florance et al. |
| 6,871,190 B1 | 3/2005 | Seymour et al. |
| 6,876,977 B1 | 4/2005 | Marks |
| 6,876,982 B1 | 4/2005 | Lancaster |
| 6,876,983 B1 | 4/2005 | Goddard |
| 6,877,655 B1 | 4/2005 | Robertson et al. |
| 6,877,665 B2 | 4/2005 | Challa et al. |
| 6,915,275 B2 | 7/2005 | Banerjee et al. |
| 6,925,446 B2 | 8/2005 | Watanabe |
| 6,928,416 B1 | 8/2005 | Bertash |
| 6,934,690 B1 | 8/2005 | Van Horn et al. |
| 6,954,734 B1 | 10/2005 | Kuelbs et al. |
| 6,990,467 B1 | 1/2006 | Kwan |
| 6,992,794 B2 | 1/2006 | Keane et al. |
| 7,013,286 B1 | 3/2006 | Aggarwal et al. |
| 7,039,603 B2 | 5/2006 | Walker et al. |
| 7,047,206 B1 | 5/2006 | Schultze |
| 7,062,452 B1 | 6/2006 | Lotvin et al. |
| 7,065,494 B1 | 6/2006 | Evans |
| 7,069,228 B1 | 6/2006 | Rose et al. |
| 7,072,849 B1 | 7/2006 | Filepp et al. |
| 7,072,853 B2 | 7/2006 | Shkedi |
| 7,076,447 B1 | 7/2006 | Peyser et al. |
| 7,080,030 B2 | 7/2006 | Eglen et al. |
| 7,082,408 B1 | 7/2006 | Baumann et al. |
| 7,103,565 B1 | 9/2006 | Vaid |
| 7,107,225 B1 | 9/2006 | McClung, III |
| 7,107,226 B1 | 9/2006 | Cassidy et al. |
| 7,120,592 B1 | 10/2006 | Lewis |
| 7,124,099 B2 | 10/2006 | Mesaros |
| 7,124,107 B1 | 10/2006 | Pishevar et al. |
| 7,133,835 B1 | 11/2006 | Fusz et al. |
| 7,143,057 B2 | 11/2006 | Kuelbs et al. |
| 7,146,330 B1 | 12/2006 | Aion et al. |
| 7,165,045 B1 | 1/2007 | Kim-E |
| 7,181,419 B1 | 2/2007 | Mesaros |
| 7,194,427 B1 | 3/2007 | Van Horn et al. |
| 7,194,442 B1 | 3/2007 | Flanagan et al. |
| 7,213,754 B2 | 5/2007 | Eglen et al. |
| 7,240,021 B1 | 7/2007 | Walker et al. |
| 7,243,082 B1 | 7/2007 | Forlai |
| 7,254,833 B1 | 8/2007 | Cornelius et al. |
| 7,263,498 B1 | 8/2007 | Van Horn et al. |
| 7,263,505 B1 | 8/2007 | Forlai |
| 7,296,001 B1 | 11/2007 | Ephrati et al. |
| 7,330,826 B1 | 2/2008 | Porat et al. |
| 7,343,317 B2 | 3/2008 | Jokinen et al. |
| 7,349,890 B1 | 3/2008 | Pathak et al. |
| 7,363,246 B1 | 4/2008 | Van Horn et al. |
| 7,364,086 B2 | 4/2008 | Mesaros |
| 7,376,613 B1 | 5/2008 | Cofino et al. |
| 7,379,899 B1 | 5/2008 | Junger |
| 7,415,428 B2 | 8/2008 | Garwood |
| 7,415,617 B2 | 8/2008 | Ginter et al. |
| 7,433,832 B1 | 10/2008 | Bezos et al. |
| 7,464,051 B1 | 12/2008 | Heggem |
| 7,475,024 B1 | 1/2009 | Phan |
| 7,480,627 B1 | 1/2009 | Van Horn et al. |
| 7,496,543 B1 | 2/2009 | Bamford et al. |
| 7,523,045 B1 | 4/2009 | Walker et al. |
| 7,539,742 B2 | 5/2009 | Spector |
| 7,542,927 B2 | 6/2009 | Mukai |
| 7,552,069 B2 | 6/2009 | Kepecs |
| 7,577,582 B1 | 8/2009 | Ojha et al. |
| 7,584,146 B1 | 9/2009 | Duhon |
| 7,593,871 B1 | 9/2009 | Mesaros |
| 7,596,509 B1 | 9/2009 | Bryson |
| 7,599,857 B2 | 10/2009 | Bishop et al. |
| 7,606,731 B2 | 10/2009 | McClung, III |
| 7,624,044 B2 | 11/2009 | Wren |
| 7,630,919 B1 | 12/2009 | Obrecht |
| 7,636,672 B2 | 12/2009 | Angles et al. |
| 7,672,870 B2 | 3/2010 | Haines et al. |
| 7,680,696 B2 | 3/2010 | Murray |
| 7,689,463 B1 | 3/2010 | Mesaros |
| 7,689,468 B2 | 3/2010 | Walker et al. |
| 7,689,469 B1 | 3/2010 | Mesaros |
| 7,693,748 B1 | 4/2010 | Mesaros |
| 7,698,173 B1 | 4/2010 | Burge et al. |
| 7,698,208 B2 | 4/2010 | Hirani et al. |
| 7,698,240 B1 | 4/2010 | Chatterjee et al. |
| 7,706,838 B2 | 4/2010 | Atsmon et al. |
| 7,725,350 B2 | 5/2010 | Schlee |
| 7,729,977 B2 | 6/2010 | Xiao et al. |
| 7,747,473 B1 | 6/2010 | Mesaros |
| 7,792,699 B2 | 9/2010 | Kwei |
| 7,801,803 B2 | 9/2010 | Forlai |
| 7,813,955 B2 | 10/2010 | Ariff et al. |
| 7,814,106 B2 | 10/2010 | Guido et al. |
| 7,814,114 B2 | 10/2010 | Mi et al. |
| 7,815,114 B2 | 10/2010 | Mesaros |
| 7,818,212 B1 | 10/2010 | Mesaros |
| 7,860,776 B1 | 12/2010 | Chin et al. |
| 7,890,373 B2 | 2/2011 | Junger |
| 7,899,707 B1 | 3/2011 | Mesaros |
| 7,912,761 B2 | 3/2011 | Vaid |
| 7,917,386 B2 | 3/2011 | Christensen |
| 7,917,416 B2 | 3/2011 | Quinn et al. |
| 7,937,288 B2 | 5/2011 | Blaser et al. |
| 7,942,316 B2 | 5/2011 | Bennett et al. |
| 7,958,007 B2 | 6/2011 | Urbanski et al. |
| 8,005,747 B2 | 8/2011 | Forlai |
| 8,015,583 B2 | 9/2011 | Bates et al. |
| 8,024,226 B2 | 9/2011 | Fusz et al. |
| 8,032,409 B1 | 10/2011 | Mikurak |
| 8,032,422 B2 | 10/2011 | Pickard et al. |
| 8,036,941 B2 | 10/2011 | Bennett et al. |
| 8,073,762 B2 | 12/2011 | Sheth et al. |
| 8,140,402 B1 | 3/2012 | Mesaros |
| 8,140,405 B2 | 3/2012 | Mesaros |
| 8,140,442 B2 | 3/2012 | Heyer |
| 8,140,615 B2 | 3/2012 | Miller et al. |
| 8,160,931 B2 | 4/2012 | Mesaros |
| 8,196,811 B2 | 6/2012 | Mesaros |
| 8,219,460 B1 | 7/2012 | Mesaros |
| 8,249,942 B2 | 8/2012 | Mesaros |
| 8,271,332 B2 | 9/2012 | Mesaros |
| 8,285,598 B2 | 10/2012 | Mesaros |
| 2001/0011264 A1 | 8/2001 | Kawasaki |
| 2001/0014868 A1 | 8/2001 | Herz et al. |
| 2001/0018660 A1 | 8/2001 | Sehr |
| 2001/0039514 A1 | 11/2001 | Barenbaum |
| 2001/0044751 A1 | 11/2001 | Pugliese, III et al. |
| 2001/0047296 A1 | 11/2001 | Wyker |
| 2001/0047311 A1 | 11/2001 | Singh |
| 2002/0007324 A1 | 1/2002 | Centner et al. |
| 2002/0026351 A1 | 2/2002 | Coleman |
| 2002/0032573 A1 | 3/2002 | Williams et al. |
| 2002/0035536 A1 | 3/2002 | Gellman |
| 2002/0040352 A1 | 4/2002 | McCormick |
| 2002/0046105 A1 | 4/2002 | Gardenswartz et al. |
| 2002/0046147 A1 | 4/2002 | Livesay et al. |
| 2002/0052782 A1 | 5/2002 | Landesmann |
| 2002/0065762 A1 | 5/2002 | Lee et al. |
| 2002/0065769 A1 | 5/2002 | Irribarren et al. |
| 2002/0069079 A1 | 6/2002 | Vega |
| 2002/0080950 A1 | 6/2002 | Koko et al. |
| 2002/0082881 A1 | 6/2002 | Price et al. |
| 2002/0091580 A1 | 7/2002 | Wang |
| 2002/0099643 A1 | 7/2002 | Abeshouse et al. |
| 2002/0103741 A1 | 8/2002 | Boies et al. |
| 2002/0107773 A1 | 8/2002 | Abdou |
| 2002/0116282 A1 | 8/2002 | Martin et al. |
| 2002/0143692 A1 | 10/2002 | Heimermann et al. |
| 2002/0147670 A1 | 10/2002 | Lange |
| 2002/0165771 A1 | 11/2002 | Walker et al. |
| 2002/0165821 A1 | 11/2002 | Tree |
| 2002/0169703 A1 | 11/2002 | Lutnick et al. |
| 2002/0169759 A1 | 11/2002 | Kraft et al. |
| 2002/0174051 A1 | 11/2002 | Wise |
| 2002/0188508 A1 | 12/2002 | Lee et al. |

| | | |
|---|---|---|
| 2003/0004802 A1 | 1/2003 | Callegari |
| 2003/0004808 A1 | 1/2003 | Eihaoussine et al. |
| 2003/0004823 A1 | 1/2003 | Sagy |
| 2003/0028473 A1 | 2/2003 | Eso et al. |
| 2003/0041002 A1 | 2/2003 | Hao et al. |
| 2003/0055774 A1 | 3/2003 | Ginsberg |
| 2003/0088494 A1 | 5/2003 | Lee |
| 2003/0093355 A1 | 5/2003 | Issa |
| 2003/0109949 A1 | 6/2003 | Ikeda |
| 2003/0111531 A1 | 6/2003 | Williams et al. |
| 2003/0115100 A1 | 6/2003 | Teicher |
| 2003/0126040 A1 | 7/2003 | Mesaros |
| 2003/0126250 A1 | 7/2003 | Jhanji |
| 2003/0149619 A1 | 8/2003 | Stanley et al. |
| 2003/0167222 A1 | 9/2003 | Mehrotra et al. |
| 2003/0195832 A1 | 10/2003 | Cao et al. |
| 2003/0200150 A1 | 10/2003 | Westcott et al. |
| 2003/0208412 A1 | 11/2003 | Hillestad et al. |
| 2003/0216960 A1 | 11/2003 | Postrel |
| 2003/0233276 A1 | 12/2003 | Pearlman et al. |
| 2003/0233557 A1 | 12/2003 | Zimmerman |
| 2004/0015415 A1 | 1/2004 | Cofino et al. |
| 2004/0039661 A1 | 2/2004 | Fuzell-Casey et al. |
| 2004/0039677 A1 | 2/2004 | Mura et al. |
| 2004/0093276 A1 | 5/2004 | Nishio |
| 2004/0128197 A1 | 7/2004 | Bam et al. |
| 2004/0215467 A1 | 10/2004 | Coffman et al. |
| 2004/0215500 A1 | 10/2004 | Monahan |
| 2005/0021400 A1 | 1/2005 | Postrel |
| 2005/0021401 A1 | 1/2005 | Postrel |
| 2005/0038713 A1 | 2/2005 | Pickard et al. |
| 2005/0149458 A1 | 7/2005 | Eglen et al. |
| 2005/0171918 A1 | 8/2005 | Eden et al. |
| 2005/0197857 A1 | 9/2005 | Avery |
| 2005/0216337 A1 | 9/2005 | Roberts et al. |
| 2005/0272442 A1 | 12/2005 | Miller et al. |
| 2005/0273415 A1 | 12/2005 | Mathews et al. |
| 2006/0036491 A1 | 2/2006 | Leung et al. |
| 2006/0059062 A1 | 3/2006 | Wood et al. |
| 2006/0069619 A1 | 3/2006 | Walker et al. |
| 2006/0095327 A1 | 5/2006 | Vaughn et al. |
| 2006/0095366 A1 | 5/2006 | Sheth et al. |
| 2006/0106678 A1 | 5/2006 | Walker |
| 2006/0129454 A1 | 6/2006 | Moon et al. |
| 2006/0143080 A1 | 6/2006 | Garg et al. |
| 2006/0178918 A1 | 8/2006 | Mikurak |
| 2007/0150349 A1 | 6/2007 | Handel et al. |
| 2007/0220169 A1 | 9/2007 | Silver et al. |
| 2008/0015711 A1 | 1/2008 | Charland et al. |
| 2008/0052189 A1 | 2/2008 | Walker et al. |
| 2008/0082418 A1 | 4/2008 | Fordyce et al. |
| 2008/0126201 A1 | 5/2008 | Ullah |
| 2008/0255886 A1 | 10/2008 | Unkefer et al. |
| 2009/0055328 A1 | 2/2009 | Bamford et al. |
| 2009/0059856 A1 | 3/2009 | Kermoal et al. |
| 2009/0083136 A1 | 3/2009 | Blackwood |
| 2009/0089177 A1 | 4/2009 | Dayton et al. |
| 2009/0187455 A1 | 7/2009 | Fernandes et al. |
| 2009/0198622 A1 | 8/2009 | Temte et al. |
| 2009/0276305 A1 | 11/2009 | Clopp |
| 2009/0307073 A1* | 12/2009 | MirrokniBanadaki et al. ............ 705/14.25 |
| 2009/0327034 A1 | 12/2009 | Peterson |
| 2009/0327038 A1 | 12/2009 | Peterson |
| 2009/0327101 A1 | 12/2009 | Sayed |
| 2009/0327140 A1 | 12/2009 | Kuo |
| 2010/0088174 A1 | 4/2010 | Cohagan et al. |
| 2010/0125525 A1 | 5/2010 | Inamdar |
| 2011/0004515 A1 | 1/2011 | Mesaros |
| 2011/0016010 A1 | 1/2011 | Mesaros |
| 2011/0040624 A1 | 2/2011 | Jhanji |
| 2011/0125592 A1 | 5/2011 | Mesaros |
| 2011/0213648 A1 | 9/2011 | Mesaros |
| 2011/0213649 A1 | 9/2011 | Mesaros |
| 2011/0213650 A1 | 9/2011 | Mesaros |
| 2011/0213653 A1 | 9/2011 | Mesaros |
| 2011/0238476 A1 | 9/2011 | Carr et al. |
| 2011/0246271 A1 | 10/2011 | Mesaros |
| 2011/0246274 A1 | 10/2011 | Mesaros |
| 2011/0264499 A1 | 10/2011 | Abendroth et al. |
| 2011/0270699 A1 | 11/2011 | Mesaros |
| 2011/0270700 A1 | 11/2011 | Mesaros |
| 2012/0022970 A1 | 1/2012 | Mesaros |
| 2012/0029993 A1 | 2/2012 | Mesaros |
| 2012/0029995 A1 | 2/2012 | Mesaros |
| 2012/0035999 A1 | 2/2012 | Mesaros |
| 2012/0036000 A1 | 2/2012 | Mesaros |
| 2012/0036031 A1 | 2/2012 | Mesaros |
| 2012/0041811 A1 | 2/2012 | Mesaros |
| 2012/0054012 A1 | 3/2012 | Mesaros |
| 2012/0158475 A1 | 6/2012 | Mesaros |
| 2012/0158479 A1* | 6/2012 | Raisch ............ 705/14.19 |
| 2012/0179526 A1 | 7/2012 | Mesaros |
| 2012/0179530 A1 | 7/2012 | Mesaros |
| 2012/0197705 A1 | 8/2012 | Mesaros |
| 2012/0197722 A1 | 8/2012 | Mesaros |
| 2012/0203603 A1 | 8/2012 | Mesaros |
| 2012/0203611 A1 | 8/2012 | Mesaros |
| 2012/0203615 A1 | 8/2012 | Mesaros |
| 2012/0209683 A1 | 8/2012 | Mesaros |
| 2012/0209737 A1 | 8/2012 | Mesaros |
| 2012/0209738 A1 | 8/2012 | Mesaros |
| 2012/0209739 A1 | 8/2012 | Mesaros |
| 2012/0209740 A1 | 8/2012 | Mesaros |
| 2012/0209743 A1 | 8/2012 | Mesaros |
| 2012/0226541 A1 | 9/2012 | Mesaros |
| 2012/0245993 A1 | 9/2012 | Mesaros |
| 2012/0253912 A1 | 10/2012 | Mesaros |
| 2012/0253977 A1 | 10/2012 | Mesaros |
| 2012/0265590 A1 | 10/2012 | Mesaros |
| 2012/0265600 A1 | 10/2012 | Mesaros |
| 2012/0278157 A1 | 11/2012 | Mesaros |
| 2012/0284110 A1 | 11/2012 | Mesaros |

FOREIGN PATENT DOCUMENTS

| | | |
|---|---|---|
| WO | WO 00/50970 | 8/2000 |
| WO | WO 00/70424 | 11/2000 |
| WO | WO 2008/083371 | 7/2008 |

OTHER PUBLICATIONS

Abad, P.L. "Supplier pricing and lot sizing when demand is price sensitive". Abad, P.L. Fac. of Bus., McMaster Univ., Hamilton, Ont., Canada. European Journal of Operational Research, vol. 78, No. 3, p. 334-54. Date: Nov. 10, 1994 [recovered from Dialog on Oct. 20, 2009].

Accompany: How it Works: "Anatomy of a Buy-Cycle", Jun. 15, 1999, pp. 1-3.

Adam et al. "Strategic Directions in Electronic Commerce and Digital Libraries: Towards a Digital Agora". *ACM Computing Surveys* [Online] 1996, vol. 28, Issue 4, pp. 818-835.

Amazon.com, "Earths Biggest Selection," Jun. 30, 2001, archived by Archive.org: http://web.archive.org/web/20010630130618/http://www.amazon.com/exec/obidos/subst/home/home.html.

Amazon.com, "Help/Shipping", Archived on Feb. 2, 2003 by www.archive.org. Last accessed Mar. 19, 2008, 9 pages.

Anon, "Global Real Estate Markets Spell Opportunity, Experts Tell Realtors," PR Newswire, Nov. 21, 1991.

Anon, "MobShop Selected by WHN(TM) (WhatsHotNow.com (R), Inc.) to Power Demand Aggregation Within Its Licensed Merchandise Marketplace; Demand Aggregation Technology Enables Marketplaces to Improve Liquidity by Generating Volume Transactions," PR Newswire, San Francisco, Jan. 16, 2001.

Anon., "China—Welcome to the Machine: New Machinery, Electronics b-to-b Web," China Online, Jul. 24, 2000.

Anon., "Domain TradeLIVE! Launched by solutionhome.com," Business Wire, Oct. 20, 1999.

Anon., "ELCOM: Virgin Trains Cuts Procurement Costs with elcom. com; New Electronic Ordering System Offers Personalised Pricing," M2 Presswire, Jul. 18, 2000.

Anon., "Excite@Home Standardizes on Siebel eBusiness; Leading Broadband Media Company Relies on Siebel Systems to Manage Customer Relationships Across Its Entire Family of Services," Business Wire, Jan. 19, 2000.

Anon., "Lucent Launches On-Line Catalog," M2 Presswire, Jan. 22, 1999.

Anon., "Open Market Introduces New Software for Dynamic Web-Based Commerce" PR Newswire, Oct. 1, 1996.

Anon., "Screen Savers," Lawyer, Feb. 19, 2001.

Anon., "The Oil & Gas Asset Clearinghouse, a Petroleum Place Company, to Host Its Second Exclusively Online Auction of Oil & Gas Properties on Aug. 14-16, 2000," PR Newswire, p. 5591, Aug. 3, 2000.

Ashton Technology Group, Inc. Announces NASDAQ National Market System Listing; Enters into Clearing Arrangements with 8 National Brokerage Firms, Business Wire, Jan. 3, 2000. http://www.findarticles.com/p/articles/mi.sub.--m0EIN/is.sub.--2000.sub.-- -Jan.sub.--3/ai.sub.--58429780/print. Last accessed Apr. 8, 2009, 3 pages.

Beaty. Mass Customisation. Manufacturing Engineer, vol. 75, issue 5, Oct. 1996, pp. 217-220.

Blyth, et al. Merchandising System Collecting Data. Derwent Information Ltd. Last accessed Jan. 20, 2009, 2 pages.

Boroshok, Jon, "Wireless, Location-Based, Shopping Portal being Tested in New York City and San Francisco by GeePS.com, Inc.," published Apr. 3, 2000, New York, NY and San Francisco, CA; as downloaded from http://www.techmarcom.com/geeps.html on Jan. 6, 2012.

Breyer. "Bargains in Cyberspace," National Home Center News, vol. 26, No. 21, p. 21, Nov. 20, 2000.

Business Editors and High Tech Writers, "eWinWin Announces the Release of DAS 3.0, the Next Generation of B2B Demand Aggregation Solutions" Dec. 28, 2000, Business wire, p. 1 (4 pages).

Business Editors. "Weatherchem Announces Major eCommerce Success with eWinWin", Aug. 9, 2001, Business Wire, (p. 1) 2 pages.

Business/High Tech Editors "Mercata Launches Compelling Alternative to Online Auctions," Business Wire, Nov. 15, 2000.

Chicago Board of Trade, "Knowledge Center," as archived by Archive.org, on Feb. 13, 2003.

Computer Geeks Discount Outlet, "Order Status," Mar. 1, 2002.

De Gheest, Computer Implemented Electronic Bidding for Electronic Sales Application. Derwent Acc No. 2001-006585, © Derwent Information Ltd. Last accessed Sep. 17, 2010, 2 pages.

Deierlein. "Smart Fuel Buying," Fleet Equipment, vol. 24, No. 8, pp. 42-44, Aug. 1998.

Dibiase. The Inventory Simulator: A Micro Computer Based Inventory Model. Modeling and Simulation on Microcomputers, Paul F. Hogan, ed., Society for Computer Simulation (SCS), La Jolla, pp. 104-106, Jan. 1987.

Easley, et al. Time and the Process of Security Price Adjustment, Journal of Finance, vol. 47, No. 2, Jun. 1992. http://ideas.repec.org/a/bla/jfinan/v47y1992i2p576-605.html. Last accessed Sep. 10, 2009, 30 pages.

ebay.com "eBay Services: The Feedback Forum," Aug. 1, 2001, archived by archive.org: "http://web.archive.org/web/20010801145144/http://pages.ebay.com/services/forum/feedback.html".

Edwards, L.M., "Increase Your Bottom Line: Automated Customer Service and Marketing," E-Business Advisor, vol. 17, No. 7, p. 30, Jul. 1999.

Enos. Vying to be the Top Dog. Upside vol. 12, No. 3, pp. 160-165, Mar. 2000.

eWinWin, "eCommerce Redefined : The Positive Impact of eWinWin's Demand Aggregation System on the Manufacturing Supply Chain", Oct. 2000. Last accessed Mar. 19, 2008, 11 pages.

Gaonkar, et al. Strategic Sourcing and Collaborative Planning in Internet Enabled Supply Chain Networks Producing Multigeneration Products. IEEE Transactions on Automation Science and Engineering, vol. 2, issue 1, Jan. 2005, pp. 54-66.

Garner, K., "Culture Vulture: Up from Under—Germaine Greer," Off our Backs, Jun. 24, 1971, vol. 1, Iss. 23, p. 14.

Gurley. Creating a Great E-Commerce Business. Fortune, Mar. 16, 1998.

Ha, Sung Ho et al., "Matching Buyers and Suppliers: An Intelligent Dynamic-Exchange Model," IEEE Intelligent Systems, 2001.

Hinze, Annika et al., "Location- and Time- Based Information Delivery in Tourism," as downloaded Apr. 20, 2012 from http://page.mi.fu-berlin.de/voisard/Papers/sstd03.pdf.

IEEE Xplore Search Results, Aug. 12, 2007.

International Search Report and Written Opinion for PCT Application No. PCT/US07/89195, mailed May 12, 2008, 8 pages.

Jonsson et al., "Impact of Processing and Queueing Times on Order Quantities," Material Flow, vol. 2, No. 4, pp. 221-230, Aug. 1985.

Kantrow, American Express Sets a Three-Tier Pricing on Optima, Dialog: File 148 #05812190 (The Gale Group), American Banker, v157, n25, p. 1(2), Feb. 6, 1992.

Kauffman et al., "Bid Together Buy Together, on the Efficacy of Group-Buying Business models in Internet-based Selling," May 16, 2001.

Koenig, et al. Quantitative Industrial Ecology. IEEE Transactions on Systems, Man and Cybernetics, Part C, Issue 1, Feb. 1998, pp. 16-28.

Lamparter, W.C., "Natural Selection," American Printer, vol. 217, No. 3, pp. 54-64, Jun. 1996.

Mack, Going Local. Adweek, Jul. 10, 2000, pp. 38-.6, © 2006 ProQuest Info&Learning. Last accessed Sep. 17, 2010, 2 pages.

Market Engineering Research for Structural Impacts of e-Business in the European Chemicals Industry (Ch. 3), Structural Impact of e-Business on the Chemicals Industry, Frost & Sullivan, Market Research Report, Jun. 2001.

Maxwell, Pricing education in the United States of America: responding to the needs of business, the Journal of Product & Brand Management, Santa Barbara, Aug. 1998, vol. 7, Issue 4, p. 336-341.

Medrano, et al. Strategic Behaviour and Price Discovery, RAND Journal of Economics, vol. 32, No. 2, Jun. 21, 2001 https://editorialexpress.com/cgi-bin/rje.sub.--online.cgi?action=view&year=2001&issue=sum&page=221&&tid=83197&sc=uogfbloa. Last accessed Sep. 3, 2009, 29 pages.

Mercata.com "How to Ship an Order" Oct. 22, 2000, archived by archive.org: http://web.archive.org/web/20001022035135/http://www.mercata.com/cgi-bin/mercata/mercata/v1/pages/editorial.jsp?name=Ship+an+Order.

Mercata.com, archived by archive.org on or before Jun. 19, 2000.

Meridex Introduces Advanced Features to its B2B Network, PR Newswire, May 25, 2000. http://www.canadait.com/cfm/index.cfm?It=106&Id=3421&Se=355&Sv=- Company&Lo=441. Last accessed Apr. 30, 2009, 3 pages.

Merriam-Webster's Collegiate Dictionary, Tenth Edition, 1997, p. 732.

Mesaros. Innovation in Difficult Times : How US Manufacturers are Using Demand Aggregation to Increase Sales and Lower Costs. Jul. 26, 2001. Last accessed Mar. 19, 2008, 4 pages.

Millman, H., "Legacy Data Links Shrinks Costs," InfoWorld, vol. 20, No. 1, pp. 51, 56, Jan. 5, 1998.

MobShop Launches New Rev of Selling App, Online Reporter, May 28, 2001. http://findarticles.com/p/articles/mi.sub.--hb5932/is.sub.--200105/ai.sub- . .--n23884526/. Last accessed Apr. 30, 2009, 2 pages.

Moody. From E-Commerce to We-Commerce. Computer Weekly, 42, Jun. 3, 1999. Last accessed Apr. 9, 2009, 2 pages.

Mullich, J., "Altrade Serves as a Natural Resource—a Head Start and Big Trading Volume Give the Natural Gas Marketplace a Competitive Edge. Can It Last?" InformationWeek, p. 152, Jun. 12, 2000.

Munson, Donald "Trading in Futures Can Provide Considerable Financial Rewards", CBOT, Last accessed Mar. 19, 2008, 41 pages.

Myers. "E-Solutions for Surplus Inventory," Dsn Retailing Today, vol. 39, No. 21, p. 13, Nov. 6, 2000.

Nellore, et al. Factors Influencing Success in Integrated Product Development (IPD) Projects. IEEE Transactions on Engineering Management, vol. 48, issue 2, May 2001, pp. 164-174.

O'Gorman, et al. Considerations for Connecting Renewable Generation into Bulk Supply Networks. Sixth International Conference on Advances in Power System Control, Operation and Management, ASDCOM 2003, vol. 2, Nov. 11-14, pp. 674-680. Last accessed Sep. 10, 2009, 7 pages.

Park, Sung Eun et al., "Efficient bid pricing based on costing methods for Internet bid systems," Dept. of Comput. Eng., Dongguk Univ., South Korea. Book Title: Web Information Systems-WISE 2006. 7th International Conference on Web Information Systems Engineering. Proceedings (Lecture Notes in Computer Science vol. 42).

Rahim, M.A., et al., "Optimal Decision Rules for Determining the Length of the Production Run" (Abstract only), Computers and Industrial Engineering, vol. 9, No. 2, pp. 195-202, 1985.
Rahim, M.A., et al., "Optimal Production Run for a Process Having Multilevel Tool Wear" (Abstract only), International Journal of Systems Science, vol. 19, No. 1, pp. 139-149, 1988.
Rahim, M.A., et al., "Optimal Production Run for a Process with Random Linear Drift" (Abstract only), Omega, vol. 16, No. 4, pp. 347-351, 1988.
Rajaraman, Rajesh et al., "The Effect of Demand Elasticity on Security Prices for the Poolco and Multi-Lateral Contract Models," IEEE Transactions on Power Systems, vol. 12, No. 3, Aug. 1997.
Rozic, Jeff "Who's Watching While You Surf?" Inside Business 3, 5, 64, May 2001.
Scott. Chains of Trust, Supply Chain Management, Manufacturing Engineer, vol. 75, issue 4, Aug. 1996, pp. 172-174.
Scott. Supply Partnerships and the Effective Management of Low Cost Components. Transforming Your Material Flow: A Practical Insight Into World Class Logistics and Supply Chain Management IEE Colloquium on, Mar. 19, 1996, pp. 2/1-2/4.
Scott. Supply Partnerships in the Aerospace Industry. Transforming Your Material Flow: A Practical Insight Into World Class Logistics and Supply Chain Management IEE Colloquium on, Oct. 24, 1996, pp. 3/1-3/3.
Sivakumar, et al. Price Match Guarantees: Rationale, Implementation, and Consumer Response. Pricing Strategy and Practice, Bradford, 1996, vol. 4, issue 4, 11 pgs. Recovered from ProQuest Database Aug. 25, 2006.
Sjostrom. Price Discrimination by Shipping Conferences. Logistics and Transportation Review, Jun. 1992, [from Dialog.RTM. File 15, Acc.No. 00727777 93-76998].
Stacklin. "Bridgestone Printing Unit Teams with ewinwin", Mar. 25, 2002, Crain's Cleveland Business, vol. 23, issue 12, 3 pages.
Swartz, Wireless Ads: Loved/Loathed. Wireless Review, Oct. 1, 2000, © 2006 The Gale Gropu. Last accessed Sep. 17, 2010.
Tanaka. "As Other Companies Crumble, Ecount Carves Out Niche in Online-Payment Services." Knight Rider Tribune News Service, Washington, Feb. 27, 2002. (Recovered from ProQuest Database Dec. 4, 2006.).
Thomas, et al. JIT: Strategies for Distant Suppliers (Abstract). Business, vol. 40, No. 4, pp. 36-39, Dec. 1990.
Tippr http://www.tipper.com/ Internet Archive (Feb. 29, 2008)—http://web.archive.org/web/20080229121727/http://tippr.com/.
Watson. The Effects of Demand Forecast Fluctuations on Customer Service and Inventory Cost When Demand is Lumpy. Journal of the Operational Research Society, vol. 38, No. 1, pp. 75-82, Jan. 1987. http://www.palgrave-journals.com/jors/journal/v38/n1/abs/jors19879a.html. Last accessed Sep. 10, 2009, 8 pages.
Wayback Machine. "Searched for http://www.ewinwin.com/corp/ewinwinwhitepaper.pdf", Oct. 2, 2008, Archive. org.
WHN Selects MobShop to Power Aggregated Buying for WHN Exchange. Jan. 23, 2001. http://www.allbusiness.com/retail-trade/4291613-1.html. Last accessed Sep. 11, 2009, 2 pages.
Yeh, R.H., et al., "Optimal Production Run Length for Products Sold with Warranty" (Abstract only), European Journal of Operational Research, vol. 120, No. 3, pp. 575-582, Feb. 1, 2000.
U.S. Appl. No. 13/271,464 Office Action mailed May 10, 2012.
U.S. Appl. No. 09/922,884 Office Action mailed May 1, 2012.
U.S. Appl. No. 09/922,884 Final Office Action mailed Jan. 4, 2012.
U.S. Appl. No. 13/104,723 Final Office Action mailed Jun. 8, 2012.
U.S. Appl. No. 13/104,723 Office Action mailed Mar. 22, 2012.
U.S. Appl. No. 13/106,622 Final Office Action mailed Jan. 3, 2012.
U.S. Appl. No. 13/269,360 Final Office Action mailed Jul. 6, 2012.
U.S. Appl. No. 13/270,133 Final Office Action mailed Jun. 12, 2012.
U.S. Appl. No. 13/270,133 Office Action mailed Jan. 3, 2012.
U.S. Appl. No. 13/292,971 Office Action mailed Jun. 14, 2012.
U.S. Appl. No. 12/710,095 Final Office Action mailed Jun. 28, 2012.
U.S. Appl. No. 12/710,095 Office Action mailed Apr. 6, 2012.
U.S. Appl. No. 13/161,192 Office Action mailed Apr. 5, 2012.
U.S. Appl. No. 13/272,144 Office Action mailed May 16, 2012.
U.S. Appl. No. 12/881,923 Office Action mailed Jun. 29, 2012.
U.S. Appl. No. 13/251,668 Office Action mailed Feb. 9, 2012.
U.S. Appl. No. 13/251,668 Final Office Action mailed Apr. 17, 2012.
U.S. Appl. No. 13/345,681 Office Action mailed Jun. 20, 2012.
U.S. Appl. No. 13/160,128 Final Office Action mailed Feb. 22, 2012.
U.S. Appl. No. 11/618,412 Final Office Action mailed May 1, 2012.
U.S. Appl. No. 11/680,415 Final Office Action mailed May 2, 2012.
U.S. Appl. No. 13/105,387 Office Action mailed Jan. 3, 2012.
U.S. Appl. No. 13/272,147 Office Action mailed Jan. 10, 2012.
*eWinWin, Inc.* v. *Groupon, Inc.* Appeal Per Curiam Decision dated Oct. 9, 2012.
*eWinWin, Inc.* v. *Groupon, Inc.* Reply Brief of Appellant dated Jun. 4, 2012.
*eWinWin, Inc.* v. *Groupon, Inc.* Brief of Appellee dated May 17, 2012.
*eWinWin, Inc.* v. *Groupon, Inc.* Brief of Appellant dated Apr. 2, 2012.
Order re Motion for Summary Judgment dated Nov. 23, 2011.
eWinWin, Inc.'s Opposition to Groupon, Inc.'s Motion for Summary Judgment of Non-Infringement dated Nov. 8, 2011.
Groupon, Inc.'s Motion for Summary Judgment of Non-Infringment dated Oct. 17, 2011.
Order re eWinWin, Inc. Motion for Reconsideration dated Oct. 3, 2011.
Order re Claim Construction dated Sep. 5, 2011.
eWinWin, Inc. Supplemental Brief in Support of Claim Construction dated Aug. 24, 2011.
Groupon, Inc.'s Supplemental Claim Construction Brief dated Aug. 24, 2011.
eWinWin, Inc.'s Reply Brief in Support of Claim Construction dated Aug. 5, 2011.
Groupon, Inc.'s Responsive Claim Construction Brief dated Aug. 5, 2011.
Groupon, Inc.'s Opening Claim Constructin Brief dated Jul. 5, 2011.
Opening Claim Construction Brief of eWinWin, Inc.dated Jul. 5, 2011.
U.S. Appl. No. 13/275,054 Final Office Action mailed Nov. 5. 2012.
U.S. Appl. No. 13/292,971 Office Action mailed Dec. 4, 2012.
U.S. Appl. No. 13/292,971 Office Action mailed Sep. 14, 2012.
U.S. Appl. No. 13/449,275 Office Action mailed Oct. 4, 2012.
U.S. Appl. No. 13/449,276 Office Action mailed Sep. 26, 2012.
U.S. Appl. No. 13/449,658 Office Action mailed Oct. 30, 2012.
U.S. Appl. No. 13/452,647 Office Action mailed Dec. 7, 2012.
U.S. Appl. No. 13/460,512 Office Action mailed Dec. 10, 2012.
U.S. Appl. No. 13/523,820 Office Action mailed Nov. 8, 2012.
U.S. Appl. No. 13/525,040 Office Action mailed Nov. 23, 2012.
U.S. Appl. No. 13/407,622 Office Action mailed Dec. 3, 2012.
U.S. Appl. No. 13/407,622 Office Action mailed Sep. 12, 2012.
U.S. Appl. No. 12/881,923 Final Office Action mailed Oct. 5, 2012.
U.S. Appl. No. 13/251,668 Office Action mailed Sep. 14, 2012.
U.S. Appl. No. 13/345,681 Final Office Action mailed Sep. 20 2012.
U.S. Appl. No. 13/621,158 Office Action mailed Dec. 5, 2012.
U.S. Appl. No. 13/274,213 Final Office Action mailed Aug. 1, 2012.
U.S. Appl. No. 13/538,302 Office Action mailed Oct. 25, 2012.
U.S Appl. No. 13/105,387 Final Office Action mailed Aug. 15, 2012.
U.S. Appl. No. 11/618,418 Final Office Action mailed Jul. 26, 2012.
U.S. Appl. No. 11/680,415 Office Action mailed Aug. 31, 2012.
U.S. Appl. No. 13/517,528 Office Action mailed Dec. 6, 2012.

* cited by examiner

METHOD AND COMPUTER MEDIUM FOR TRACKING SOCIAL INTERACTIONS AND TARGETING OFFERS

CROSS-REFERENCE TO RELATED APPLICATIONS

The present application is a continuation and claims the priority benefit of U.S. patent application Ser. No. 13/424,226 filed Mar. 19, 2012, which is a continuation and claims the priority benefit of U.S. patent application Ser. No. 12/788,513, filed May 27, 2010, and entitled SOCIAL PRICING, now U.S. Pat. No. 8,140,402, which:

(1) is a continuation-in-part and claims the priority benefit of U.S. patent application Ser. No. 09/922,884, filed Aug. 6, 2001, and entitled E-COMMERCE VOLUME PRICING, which:

(a) is a continuation-in-part and claims the priority benefit of U.S. patent application number Ser. No. 09/324,391, filed Jun. 3, 1999, and entitled E-COMMERCE VOLUME PRICING, which claims the priority to U.S. provisional application No. 60/133,769, filed May 12, 1999, and entitled E-COMMERCE VOLUME PRICING;

(b) is a continuation-in-part and claims the priority benefit of U.S. patent application Ser. No. 09/426,063, filed Oct. 22, 1999, and entitled MULTIPLE CRITERIA BUYING AND SELLING MODEL, now U.S. Pat. No. 7,818,212;

(c) is a continuation-in-part and claims the priority benefit of P.C.T. patent application number PCT/US00/11989, filed May 3, 2000, and entitled MULTIPLE CRITERIA BUYING AND SELLING MODEL, AND SYSTEM FOR MANAGING OPEN OFFER SHEETS, which claims priority to: U.S. provisional application No. 60/137,583, filed Jun. 4, 1999, and entitled E-COMMERCE AUTOMATED SELLER SELECTION SYSTEM; U.S. provisional application No. 60/138,209, filed Jun. 9, 1999, and entitled SECURITIZATION OF ACCOUNTS RECEIVABLE; U.S. provisional application No. 60/139,338, filed Jun. 16, 1999, and entitled REAL-TIME OPTIMIZED BUYING BLOCK; U.S. provisional application No. 60/139,518, filed Jun. 16, 1999, and entitled REAL-TIME MARKET PURCHASING; U.S. provisional application No. 60/139,519, filed Jun. 16, 1999, and entitled E-COMMERCE PURCHASING CARD; U.S. patent application Ser. No. 09/342,345, filed Jun. 29, 1999, and entitled CREDIT BASED TRANSACTION SYSTEM AND METHODOLOGY; U.S. provisional application No. 60/142,371, filed Jul. 6, 1999, and entitled TIME VALUE OF MONEY BASED CREDIT CARD FOR MERCHANT; U.S. provisional application No. 60/160,510, filed Oct. 20, 1999, and entitled MULTIPLE CRITERIA BUYING AND SELLING MODEL, AND SYSTEM FOR MANAGING OPEN OFFER SHEETS; U.S. patent application Ser. No. 09/426,063, filed Oct. 22, 1999, and entitled MULTIPLE CRITERIA BUYING AND SELLING MODEL, now U.S. Pat. No. 7,818,212; U.S. provisional application No. 60/162,182, filed Oct. 28, 1999, and entitled MULTIPLE CRITERIA BUYING AND SELLING MODEL, AND SYSTEM FOR MANAGING OPEN OFFER SHEETS; and U.S. provisional application No. 60/173,409, filed Dec. 28, 1999, and entitled MULTIPLE CRITERIA BUYING AND SELLING MODEL, AND SYSTEM FOR MANAGING OPEN OFFER SHEETS; and (d) claims priority benefit to U.S. provisional application No. 60/237,474, filed Oct. 2, 2000, and entitled MULTIPLE CRITERIA BUYING AND SELLING MODEL, AND SYSTEM FOR MANAGING OPEN OFFER SHEETS.

(2) which claims the priority benefit of U.S. provisional application No. 61/183,390, filed Jun. 2, 2009; and (3) claims the priority benefit of U.S. provisional application No. 61/230,248, filed Jul. 31, 2009. The disclosures of the aforementioned applications are incorporated herein by reference.

BACKGROUND

Buying and selling of goods and services (collectively referred to as "products") has resulted in a vast array of costing schemes, which are used to select the price at which such products are sold. One of the most common costing schemes that consumers encounter everyday is known as fixed pricing. According to this costing scheme, sellers set a fixed price for their products based on a past demand for the product and/or anticipated future demand. Buyers who desire to purchase products from seller are each required to pay the same fixed price regardless of the number of products purchased. If a seller finds that the demand for a given product is greater or less than expected, the seller may later adjust the fixed price of the product to account for such findings. Although fixed pricing provides a simple way for a seller to conduct business with multiple buyers, one drawback of this costing scheme is that it fails to reward buyers willing to purchase greater quantities of products. Accordingly, the discount quantity-pricing scheme evolved.

The discount quantity-pricing scheme approach to costing involves pricing a product at different levels depending on the quantity of products a customer is willing to purchase. The more products a customer is willing to purchase, the lower the price per product. Sellers have an incentive to lower prices for large quantity buyers since the fixed costs associated with producing the product is spread over more items. Thus, sellers are able to make equal or greater profits despite the lowered price of the product. While volume pricing offers a benefit to larger buyers who are able to purchase large quantities of goods at one time smaller buyers are often unable to obtain the lowered prices and therefore are more likely to "shop around" for the best available deal. This, in turn, hurts both the buyer and seller. For instance, the smaller buyer is burdened with needing to search for alternative deals and still often ends up paying a higher price than larger buyers pay. The sellers, on the other hand, are faced with lost business since they are unable to reduce their price for the smaller buyers and still make sufficient profit.

Another common costing scheme for pricing a product is an auction. In an auction, a seller sets an initial price for an item and then multiple buyers are given an opportunity to bid against one another for the product. The buyer who agrees to pay the highest price for the product purchases the product at the end of the auction at the final price bid. In order to provide a larger forum for buyers and sellers, a recent trend has been to auction goods electronically over the Internet. For example, one company known to operate an auction site over the Internet is eBay, Inc. Although auctions provide advantages when selling unique products for which customers are willing to competitively bid, the auction forum is not well suited for sellers desiring to sell large quantities of goods to multiple buyers given the inherent inefficiencies involved with selling one product at a time in a bidding environment.

Yet another costing scheme that has been advanced is buyer-driven bidding. According to this costing scheme, a single buyer desiring to obtain a product communicates a price at which the buyer is willing to purchase the product to multiple sellers. Each of the sellers is provided an opportunity to review the buyer's price. A sale is complete when one of the sellers agrees to sell the product to the buyer at the price suggested by the buyer, or at a price included in a counteroffer. While the buyer-driven bidding scheme provides advantages for certain types of transactions when, for example, sellers may be willing to sell products at lower than normal prices, the uncertainties involved with whether a buyer's offer will be accepted is often problematic.

While the costing schemes described above have various advantages and disadvantages in different situations, a commonality among all of the costing schemes is that each buyer operates independently with one or more sellers to set a purchase price of a product. For example, in the fixed pricing scheme and discount quantity purchasing scheme, buyers individually determine whether the sellers preset price schedule is acceptable regardless of whether other buyers have decided to purchase the product or not. In an auction, not only do buyers operate independently of other buyers, but, in fact, each buyer's decision to place a bid has a negative effect on all other buyers desiring to purchase the same good since the price of the good increases for all potential buyers. Similarly, in a buyer-driven bidding scheme, each buyer is completely unaware of the amount other buyers are bidding for a given product.

SUMMARY

The following presents a simplified summary of the disclosed subject matter in order to provide a basic understanding of some aspects of the disclosed subject matter. This summary is not an extensive overview of the disclosed subject matter. It is intended to neither identify key or critical elements of the disclosed subject matter nor delineate the scope of the disclosed subject matter. Its sole purpose is to present some concepts of the disclosed subject matter in a simplified form as a prelude to the more detailed description that is presented later.

Briefly described, the subject disclosure pertains to social pricing and mechanisms in support thereof. In particular, systems and methods are provided to broker group-buying transactions between buyers and sellers, as well to utilizing social networks and other online technologies for promoting purchases by others. Sellers can initiate a sale of a product with volume discounts for a limited time. Buyers have a real incentive to become "prosumers" who not only purchase a product but also promote purchase by others to obtain a lower price all buyers. Consequently, sellers can increase sales, profit, market share, and/or brand awareness while buyers realize true costs savings for participating in a deal and can recognize additional cost savings by promoting the service to others, or by engaging in other behavior mutually beneficial behavior.

The following description and the annexed drawings set forth in detail certain illustrative aspects of the disclosed subject matter. These aspects are indicative, however, of but a few of the various ways in which the principles of the disclosed subject matter may be employed and the disclosed subject matter is intended to include all such aspects and their equivalents. Other advantages and distinguishing features of the disclosed subject matter will become apparent from the following detailed description of the disclosed subject matter when considered in conjunction with the drawings.

DETAILED DESCRIPTION

Figure 1:
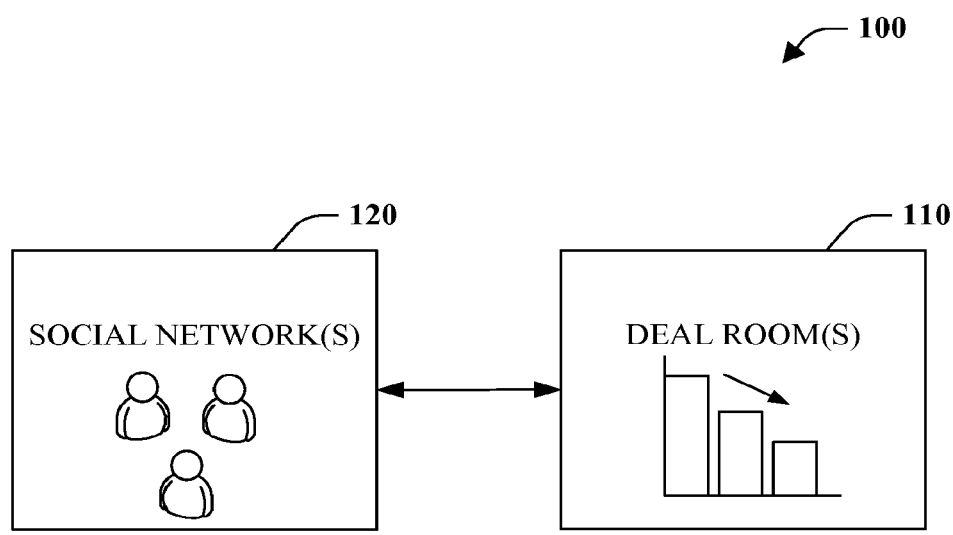
FIG. 1 is a block diagram of product purchase system in accordance with an aspect of the disclosure.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

As used in this application, the terms "system," "component," "interface," and the like are intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. An interface can include input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed subject matter.

As used herein, the terms "infer" or "inference" generally refer to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Referring now to the drawings, with reference initially to FIG. 1, product purchase system 100 is illustrated in accordance with an aspect of the disclosure. As depicted, system 100 can include one or more deal room 110 all or a portion of which can be coupled to one or more social network 110 by way of a wide area network such as the Internet or web.

As used herein, a deal room can be an electronic forum in which a product is offered for sale. For example, deal room 110 can be embodied as a particular web page, website, banner ad, pop-up, dialog box, web-based application, or the like. Furthermore, deal room 110 can include a price curve or price schedule that affords discounts based on aggregate purchases. In other words, the price per unit can lower for all participants as quantity purchased increases. The seller of a product and/or the creator of deal room 110 can control the specific slope, number of tiers, break points, tipping points, or other price schedule characteristics. Furthermore, while all products offered in deal room 110 will generally be associated with a price curve that breaks to lower price tiers with increasing aggregate volume (or tips upon reaching a particular critical mass), deal room 110, in one or more aspect, need not display the entire price curve or even be configured with more than one price break/tipping point.

In fact, research suggests that buyers often disfavor or are confused by price curves, especially those with multiple price breaks. Such can be so in spite of the fact that multiple price breaks affords the buyer multiple opportunities to save additional amounts on their purchases. Thus, at any given point in time, access to deal room 110 can present, inter alia, a current price, time remaining for the offer, a current discount received thus far (e.g., versus retail and/or the starting price), and the amount of additional purchases necessary to meet the next break point. In addition, the amount of additional savings that can be obtained upon reaching that next break point can also be presented, while additional break points can be suppressed from presentation until a prior price break is reached. Moreover, the number of deal rooms 110 and particular type (e.g., public/private) can also vary as will be discussed further hereinafter.

Since the final price of a product unit can be dependent upon the total quantity purchased, buyers or consumers have a natural incentive to promote purchase of the product. Stated differently, consumers can become prosumers—those that not only purchase a product, but also act in desired ways, typically intended to promote, inform, or evaluate with respect to the deal or product offered in deal room 110, and thus can contribute to what can be referred to herein as "social pricing." One manner in which such promotion can be accomplished is via one or more social networks 120 (e.g., Facebook, MySpace, LinkedIn . . . ). Prosumers can advertise a particular product to friends, family, and/or coworkers, or other contacts, e.g., by utilizing social network 120 and can optionally provide a link to a particular deal room 110 to purchase a product.

It should be appreciated that by encouraging prosumers, value can be created for all participants. For example, all buyers (e.g., consumers) can benefit from the activities of the prosumer, as does the prosumer by virtue of a lower price for the product. To offset this lower price afforded to buyers, the seller has increased sales, providing an economic benefit due to fixed-cost production and has potentially increased market share or brand awareness as well. Moreover, the seller can save a significant amount of money up front by reducing an advertising budget, all or a portion of which can be redirected to discounts for actual buyers instead, which can lead to higher customer loyalty and satisfaction with less risk than traditional methods of advertising or marketing. It should be understood that while the notion of offering incentives and/or rewards for marketing one's product exists in conventional systems, the above can be distinguished in that all or a portion of the incentives/rewards obtained by the prosumer can be allocated to other buyers in addition to the individual prosumer.

It is therefore to be noted that prosumers need not be seen as merely self-interested profiteers relying on the purchases of others, which is a particularly undesirable viewpoint when those others are friends, family, or colleagues. In accordance with one embodiment, a prosumer can be required to make a purchase or become an active buyer prior to receiving any type of incentive for promoting a purchase to others. In this way, the prosumers has "put his money where his mouth is" which, ostensibly, he or she would not have done unless the deal is perceived as a bargain. Furthermore, sharing bargains with others (or advocating products genuinely esteemed) is more readily identified with a generous enterprise, and certainly the type of behavior friends or family would expect to be made aware of. That such behavior can also be beneficial to the prosumer, makes such a symbiotic win-win, and that much better. In addition, such viral advertising from prosumers typically carry much more weight than, say, spam, ads, reviews, or the like from an unknown party or entity.

On the other hand, by leveraging existing social networks 120, it can be presumed a trust relationship of some type already exists between the promotee (e.g., a friend of the prosumers) and the promoter (e.g., the prosumers), and further that the promoter may have personal knowledge of the needs, tastes, desires, or interests of the promotee. Moreover, if the promotee is aware that the promoter has "put his money where his mouth is", then any such advertisements from the promoter will typically carry even more weight. For instance, the promotee can be further assured that the promoter truly believes the offer exhibited by deal room 110 is both bona fide and a bargain, as evidenced by his or her own willingness to purchase. Moreover, the prosumer can also receive additional value out of his or her social network 120 by, e.g., receiving discounts or other economic benefits with very little additional effort; all while keeping in touch with friends, family, colleagues, or other contacts. In addition, the prosumer can also share similar benefits with those contacts, which can be a source of gratitude or esteem within his or her social circle.

One means of accomplishing the foregoing is to provide a buyer promote page upon the conclusion of a product order. Hence, the buyer promote page can be displayed after the buyer has made an order (even though the offer may still be live for several more hours or days, and the ultimate price paid can be lower than the current price). The buyer promote page can congratulate the buyer for successfully ordering a product that is likely to represent a deep discount over retail even at the current or initial price, as well as displaying and updating in real time various data associated with the offer. For example, the buyer promote page can indicate, e.g., that 15 more buyers have agreed to purchase the product, so the final price paid is now an additional 11% lower.

Furthermore, the buyer promote page can also entice the buyer to become a prosumer. Any such enticement can be configured according to the seller's desires. For example, the buyer promote page can further indicate, e.g., that if X more buyers purchase the product, then everyone in the buying group will get an additional Y % off.

Accordingly, to aid the buyer in reaching the next price break, and thereby facilitating a transition from mere consumer to prosumer, the buyer promote page can include icons representative of and including embedded links to popular (potentially third party) social network 120. Some example existing social networks can be, e.g., Facebook, Twitter, MySpace, Wordpress or the like, as well as an icon to send targeted emails to indicated individuals. Upon clicking one of these links, the buyer can be redirected to the selected social network 120, whereupon he or she can login and be given an option to download a social pricing app.

Figure 5:
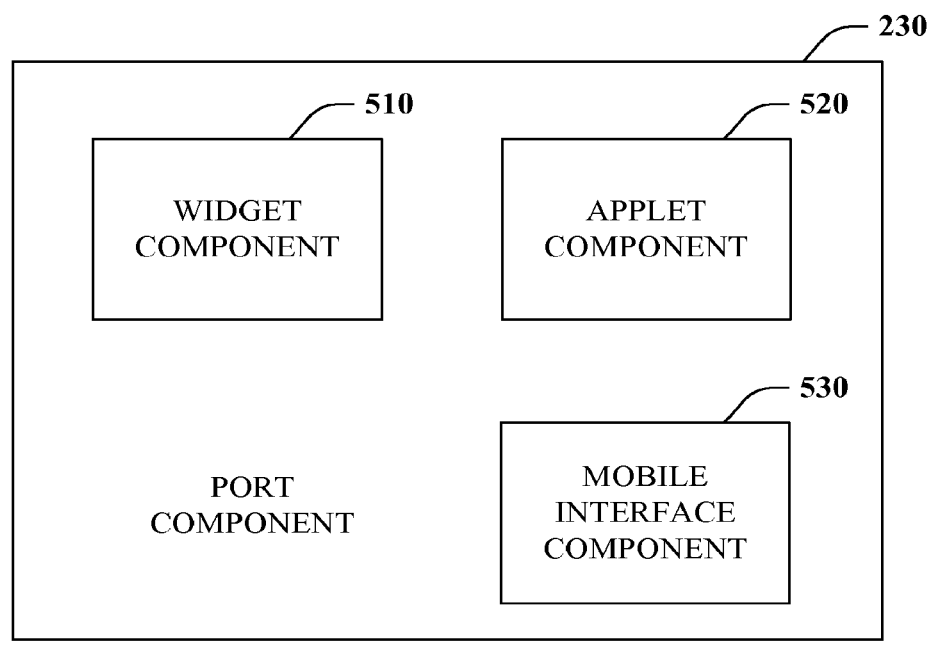
FIG. 5 is a block diagram of a representative port component according to a disclosed aspect.

Additional detail with respect to features consistent with a social pricing app can be found with reference to FIG. 5 and particularly with respect to elements 510 and 520. However, as a brief introduction, the social pricing app can be expressly designed to help promote the product ordered in deal room 110. Moreover, the social pricing app can be programmed for operability with the selected social network 120. For instance, each social pricing app can be designed for substantially the same purpose, but will likely differ in implementation due to various proprietary constraints of the many disparate social networks 120. Furthermore, although each social pricing app can be designed to facilitate prosumer activity, each social pricing app can operate differently due to various distinguishing platform features, many of which can be leveraged in different ways to facilitate promotion of the product offered in deal room 110.

It should be appreciated that access to various suitable social pricing apps is merely one example of elements that can be included on the buyer promote page. Ultimately, the seller can be free to suggest or require any type of prosumer activity that is deemed to have value to the seller, any of which can be indicated on the buyer promote page. For example, from the seller's perspective, many different activities of the prosumer can be valuable (e.g., telling friends about the deal, writing reviews, ranking . . . ), while from the prosumer's perspective some activities can be more difficult than others to accomplish. Therefore, the buyer promote page can include, e.g., a drop-down list of activities the seller desires the prosumer to engage in. Accordingly, the prosumer can select among the list, choosing which behavior to pursue, and thereby satisfying the desires of the seller as well. Appreciably, certain activities can be deemed to have more value to the seller than others. Therefore, the buyer promote page can indicate, e.g., that if the prosumer engages in at least one activity listed from box A (e.g., encourage at least 3 new buyers, download and activate a social pricing app to a preferred social network . . . ), and two activities from box B (e.g., email at least 5 friends about the deal, write a review of the product or offer, give a ranking of the product or offer . . . ), then the prosumer can be eligible for additional rewards.

As another example, it may be that the price has already reached its lowest possible price (according to a price curve set by, e.g., the seller), in which case such can be indicated on the buyer promote page. However, that does not mean additional value to the seller cannot be created by prosumers, for which the seller can reciprocate in some way. In this case, as well as some others, various incentives can be offered specifically to the prosumer, rather than to the entire buying group, however, such need not necessarily be the case as these incentives can also be group-wide. Regardless, it should be appreciated that the rewards need not be confined to a lower price for the product. Rather, rewards can relate to discounts on other items or future deals, an upgrade to the product or related accessory, a free gift, redeemable points, personal recognition (e.g., displaying the prosumer's name or username or possibly a profile photo, and with accolades distributed to various interface dashboards, banner ads, social pricing apps or the like), and so forth. It should be appreciated that personal recognition can also be employed in connection with buyers as well as prosumers, e.g., when a particular buyer tips the offer or breaks the price to the next tier, such recognition can be showered upon that buyer, potentially creating a more exciting and/or rewarding environment.

Continuing the discussion, it should be noted that market studies suggest ratings of the product (or the seller or manufacturer) from other buyers can operate as the most powerful influence on another buyer's decision to purchase. Due to certain ratings and feedback mechanisms available on many ecommerce platforms, an entire generation of buyers has been trained to check star ratings on a vendor, read the experiences of others, do other research, and compare price options prior to ordering. Vendors, as well as their products, are being vetted by the wisdom of the crowd. Therefore, social pricing can improve upon the above by, e.g., ensuring such vetting originates from an actual buyer (rather than say, from an anonymous representative of the vendor, which is a common fear of the product researcher). Moreover, social pricing can, in some cases, further bolster the veracity of a review or ranking by virtue of the social relationships that previously exist when utilizing social network 120 platform. For example, if a friend or contact on a particular social network 120 writes a review of, or gives a high rating for, or provides a link to an offer in deal room 110, then the motives of that friend or contact can be known with greater reliability due to the established relationship.

However, it should be noted that social pricing does not work for all products equally. For example, there are certain known conditions for increasing the likelihood of sustainable success when using social pricing. These are, e.g., (1) Standard product with standard options; (2) Highly fragmented, price sensitive buyers; (3) Product that has a repeat purchase cycle—an item that is consumed or resold to others; (4) Product that can be stored easily so that a buyer could be enticed to purchase more; (5) A Favorable Product life cycle—can be anywhere in the life cycle, but clearly, benefits have been dramatic when it is an early life cycle product in search of a expanding customer acceptance and conversely, the product late in the life cycle when slower moving items can be liquidated effectively to a fragment set of buyers; and (6) A leader within the seller organization who can experiment with what works for their particular situation. Regardless, merely because a product does not meet all six criteria does not necessarily mean the product will not be successful in connection with social pricing. Rather, the criteria above are meant to illustrate where the low hanging fruit exists for vendors, and is not intended to be exclusive of other opportunities in which social pricing makes sense and/or can function successfully.

As one example of a potentially successful viral marketing and/or social pricing of the type indicated supra, if is a prosumer provides a link to a deal on social networking site(s) for which the prosumer is a member at least a portion of the prosumer's friends are likely become prosumers themselves. Should those new prosumers post information on their own networking sites or pages, a large number of people can be notified and potentially grouped quite rapidly. However, aggregation need not be confined to friends and friends of friends, or members of a particular contact list, or the like. Rather, purchases by others of no relation or connection who also become aware of the deal in some manner (e.g., electronically, verbally, by way of search . . . ) can also become prosumers and can have their purchases aggregated to lower the price for everyone. In this manner, the power of computer networks can be leveraged to group purchases amongst large numbers of people who may not know each other, may not be geographically related, or related any other way except for a shared desire to purchase or promote a particular product during a given period. Still further yet, such grouping can be performed in real-time in accordance with one or more aspect.

It should be appreciated that products ordered via deal room 110 are not necessarily limited only to conventional online order-and-ship models. For example, when purchasing, say, a book, it is common to do so online, whereby the vendor charges the buyer and ships the book to an address on file. On the other hand, the vendor may operate widespread brick-and-mortar stores, whereby shipping can be an option, but the vendor might prefer if the buyer physically visits a local store. In the latter case, rather than shipping the book, the vendor can authorize a voucher or certificate for the buyer, which can be printed or mailed to the buyer. In either case, the vendor can capture payment information (e.g., credit or debit card information, bank account information . . . ) upon completing an order, but process the actual debit of funds after the deal closes and the final price (potentially with additional discounts) is determined.

Accordingly, the exclusively online vendor can have the option to mail the book immediately upon order or wait until funds are actually received. Likewise, the brick-and-mortar vendor can have similar options with respect to the voucher. It should be appreciated that there can be an incentive for the vendor in either case to immediately remit the product (e.g., either the book or the voucher) because should the buyer obtain the product prior to the close of the offer in deal room 110, the buyer can provide additional feedback that can be desired by the vendor. For example, rather than merely ranking or reviewing the offer, the buyer can now rank or review the product itself as well as the quality of the transaction with the vendor, which expands the options in which a prosumer can contribute to the social pricing ecosystem.

Moreover, for certain products, especially services such as restaurant dining, salon visits, or the like, vouchers can be much more suitable. In one or more aspects, the voucher can be printed at the time of order, e.g., with the buyer's attached printer, and thereafter redeemed at a vendor's place of business. In other cases, the vendor can mail the voucher or certificate, which unlike with immediate printing can be implemented as, e.g., a gift card with a magnetic stripe on the card. Another approach can be to allow the download of a barcode, which can be stored to a mobile device to be redeemed at the store. Appreciably, numerous other options can exist.

It should be understood that in certain cases, the voucher can include one or more fraud prevention mechanisms. For example, the voucher can include a unique coupon code, which upon redemption can be scanned or otherwise input to a database to ascertain the identity of the valid recipient. Similarly, the voucher or certificate can include the buyer's name, and in either case, then compared with ID of the redeemer at the point-of-sale. As yet another example, notifications can be delivered to the authorized owner of record of the voucher upon redemption (e.g., via email). Thus, if the owner of record did not redeem the voucher, various resolution procedures can be initiated. Of course, numerous other fraud-prevention mechanisms can be employed such as holographic marks, certificates of authentication (COA), secret pin numbers, and so forth.

On the other hand, various mechanisms can be provided to enable transferability to these vouchers, even while maintaining a degree of fraud-prevention. For example, suppose the product offered in deal room 110 is a $50 gift card good at a participating restaurant. Suppose at the time of order, the buyer intends the gift card to be used by her parents for their upcoming anniversary. Deal room 110 can provide a mechanism for this information to be entered (e.g., a check box or radio button) and collect all necessary information at the time of order. As another example, if the buyer decides to transfer the voucher at a later time, the buyer can be provided with a mechanism to do so (e.g., by following a URL on the voucher or included in an email associated with the purchase), where the recipient's information can be entered. The above examples are intended to be merely exemplary, and in some embodiments, such as those that allow completely free transfer, or those that include a secret pin number that can be shared with the recipient, can be unnecessary in any event.

Regardless of the means for fraud detection or prevention, it can be appreciated that these vouchers can represent stored value, and can even trade and function as a market until themselves. Accordingly, when dealing with such stored value, the disclosed subject matter can provide numerous additional features, either to facilitate transfer or to mitigate fraud attempts. For example, print limits can be implemented for a given voucher such that the recipient can only print the voucher a predetermined number of times or for a predetermined period of time. Another example can be viewless printing, where the voucher is not reproduced on a monitor, but merely capable of being printed by a suitable device. Still another example can be single-use printing, wherein the voucher can only be printed once. Additionally or alternatively, watermarking can be employed such that watermarks can be printed on the background of the voucher in order to mitigate fraud (e.g., thwart photocopying or similar reproduction means). It should be understood that mechanisms can be distributed to provide any of the above-mentioned functionality to a buyer's personal computer. In other cases, a link to the voucher can be delivered to an email address of the buyer, whereupon clicking the link directs a browser to a particular URL that can facilitate any of the above features, and can track and regulate the printing without any control of personal devices of the buyer.

In other aspects, group offers can be tied to a particular IP address or to the location of a device, for example determined by way of global positioning satellites (GPS) or other means. In particular, approximate location can be determined by signal triangulation (or trilateration). For example, signal strength measures at various stationary transceivers can be measured by well-known means in order to pinpoint the location of the transmitting device. One such example is Wireless Application Protocol (WAP), wherein radio location, triangulation, and/or trilateration can be employed in connection with radio waves or other electromagnetic radiation. Another example can be radio frequency identification (RFID). Regardless, group offers can be based upon the exact or approximate location of the recipient (e.g., within 20 miles of the vendor's place of business). Should the offer be received by one beyond the predetermined boundaries, then an opt-in email page can be provided upon a click-through rather than the offer.

In other words, location of one or more buyer or one or more seller can be monitored or tracked, potentially in real time and typically based upon express permission and/or based on an opt-in program expressly consented to. Thus, for example, consumers can search based upon location and vendors can, as noted above, broadcast ads or incentives to consumers within a particular radius of the vendor's place of business. In either case, results can be presented automatically on a cell phone or other mobile device, via email, etc.

Moreover, such location information can be integrated with or further leveraged in connection with other features disclosed herein. For instance, general or custom ad space can be provided to an interface, such as a banner ad or small pop-up or dialog box presented at an allocated portion of the interface on the mobile device or other interface component. The ad can change or be selected based upon location, category, preferences, profile, friends/contacts, location or logistics of friends/contacts. Additionally or alternatively, the ad can present special group or individual deals directly to particular consumers based upon the selected criteria. Furthermore, various maps or graphs or charts can be presented relating to information about those in a particular buying group (e.g., purchased a common product, etc.) or in a related group, or based upon some other relationship. For example, a map of a geographic region of interest to a buyer or a seller can be presented. The map can include visual indicia relating to the location or identity of who, e.g., purchased, rated, ranked, provided feedback, influenced others, responded to the influence of another, shared feedback and so forth. Hence, sellers can be apprised of the proximity of potential buyers or mavens in proximity of his or her place of business, while potential buyers can use these features to locate friends or contact (or anyone who grants access). Moreover, various information relating to particular points of interest included in the map can presented within the map. For instance, if a particular restaurant is selected or is in the visible map region, a ranking, rating, or recommendation (e.g., pulled from a social network 120) given by a member of one's contact list can be displayed or accessed. Likewise, local deals (e.g., pulled from or pushed by deal room 110) can be presented as well. It should be appreciated that each classification (e.g., selected from among various map controls) listed above on the map or chart, as well as others, can potentially be distinguished with unique visual indicial such as color coding or the like, and such can be presented to buyers or sellers alike. As another example, ad space included in the banner ad or other ad real estate can be bid upon by sellers. For instance, a seller can bid on certain product classes, keywords, groups or group deals, as well as location or combinations thereof.

Furthermore, a "rifle shoot" deal can be directed to a primary contact (e.g., a maven or influential individual, potentially based upon past activity or an inference thereof such as similarity to known mavens). Typically, this maven will have a large network of contacts that can be influenced, which can be even more beneficial if it is known the maven (or members of the maven's social network) is in close proximity to the vendor's place of business. As another example, the rifle shoot can be targeted to or be activated by a location of the target (e.g., deal goes live when it is detected an individual is local).

In one or more aspects, searches of one individual or potential buyer (e.g., a maven) can be saved or copied and delivered to others such as contacts of the maven. Such a feature can also be dependent upon an opt-in program, or can be utilized to help disparate buyers formulate more effective searches. Moreover, common searches can provided as a set of defaults, which can be selected from among various databases and/or indexed in specific ways, such as, e.g., "see all local deals", "see all bargains that I might be interested in that are being offered right now in my present area", "view what my friends have bought/provided feedback recently at this location" or other permutations.

In view of the above features described with respect to location data, consider the following example. Suppose a restaurant owner (e.g., seller) displays a map of her restaurant, which indicates that 100 (potentially random) people are currently within 500 feet of her restaurant. Ads or other enticements or requests can be delivered immediately to all or a portion of those 100 people. Moreover, the time of day can be logged (e.g., meal time), which can be compared to other data points at other times to, e.g., determine the highest volume time of day, date of week, or the like. Regardless, the restaurant owner can configure a deal to be broadcast at a specific time and repeat at specific intervals (e.g., daily, weekly . . . ). Ratings of those who gave feedback can be tracked and shared with friends or in the aggregate with all. Moreover, distinctions between different ads and their resultant effects (e.g., increased/decreased clicks or conversions, feedback, etc.) can be stored for future analysis.

Leaving now examples specifically directed to location-based criteria, in one or more aspects, a notion of game theory can be applied to the demand aggregation mechanisms utilized in deal room 110, specifically when conditional orders—orders in which the buyer is not obligated to purchase unless the deal reaches a certain price—are employed. In particular, the concept of a buyer voluntarily giving a portion of her discount (due to a tipping point/price break) to other buyers if they will agree to order. For instance, consider an item currently priced at $10, with a price curve that indicates the price will drop to $8 per unit if at least 200 units are order, and drop again to $7 per unit if 500 units are ordered. Assume in this case that 100 units have been ordered at the starting price of $10, and another 50 have been conditionally ordered if the price reaches $8, and still another 50 units have been conditionally ordered if the price reaches the minimum illustrated on the price curve of $7.

It is readily apparent that if 100 units were conditionally ordered at $8 dollars, then the server could immediately note this and fill all 200 units at the middle price point of $8. Specifically, both the first 100 units ordered at $10 as well as the second set of 100 ordered at $8 can all be filled at $8 since, the seller's first break point was reached. However, in this case, there are only 150 units ordered in which the buyer is willing to pay $8 or more (e.g., 100 ordered at $10, and 50 conditionally ordered at $8), which does not satisfy the seller's minimum to lower the price to $8. However, in this situation, there are also 50 conditional buyers at $7 per unit that remain to be considered. If each of these 50 conditional buyers at $7 per unit could be allocated an extra dollar, then the total number of units ordered would reach 200, thereby obligating the seller to drop the price from $10 to $8.

Naturally, this $1 subsidy is not especially likely to be allocated by the seller or the buyers at $7 or $8 per unit, however, for those 100 already willing the buy the product at $10 (even if desiring an eventual lower price), there is an incentive. In this case, (and assuming 1 buyer per unit) 50 of the 100 buyers willing to pay $10 per unit can offer a portion of their volume-based discount (which would be a discount of $2 if the volume reaches 200) to entice further buying. In particular, those 50 buyers at $10 can each give $1 to the 50 buyers at $7 (or all 100 can give $0.50 to each buyer at $7). As a result, the 50 buyers at $7 can be treated as though their order is at $8 per unit, thereby satisfying the first break point of 200 units ordered necessary to drop the price from $10 to $8. As a further result, all or a portion of the buyers willing to pay $10 will not get the lowest price at the conclusion of the offer. However, those buyers will still receive the product at a price lower than they would have if they had not voluntarily agreed to reduce their eventual discount (e.g., $9 per unit as opposed to $10, even though others will receive a price of $8 per unit, and still others only at $7). Such can be accomplished by, e.g., a check box or radio button on an order form, indicating something to the effect of "Are you willing to apply some portion of further discounts to entice additional buyers, which will not operate to raise you final price, just lower it, albeit not as low as what some others might receive."

In the above example, if more than 50 buyers at $10 check this box, then the 50 ultimately selected can be based upon a first-in, first-out (FIFO) queuing method, based upon customer preference, server preference, or some other criteria. Likewise, if more than 50 buyers exist at $7, then the 50 who receive the $1 windfall can be based upon first-come, first-served basis, or some other criteria. Moreover, the features described above can be configured to activate only at the expiration of the offer. Thus, if more orders are received at either $10 or $8, fewer enticements from $10 buyers need be distributed to those willing to buy at $7 in order to meet the volume requirement of 200 units.

Figure 2:
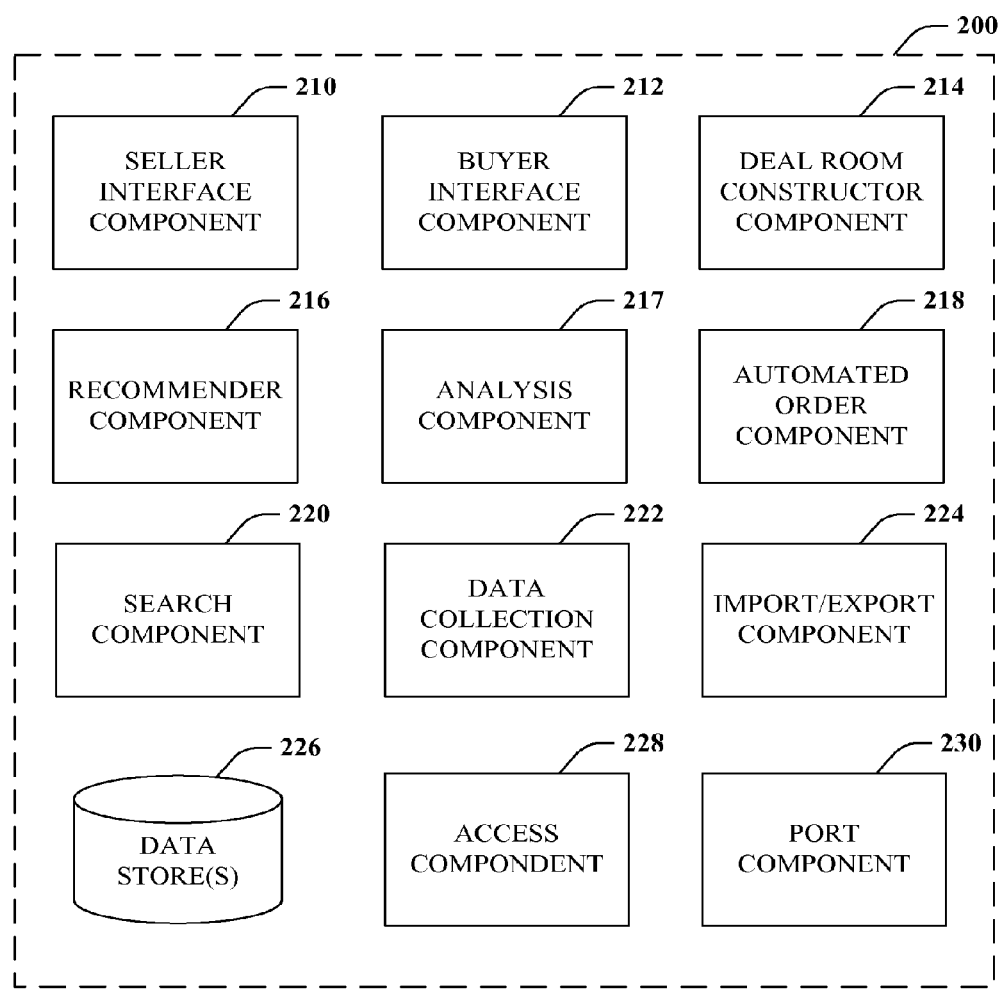
FIG. 2 is a block diagram of a social pricing system according to a disclosed aspect.

Turning now to FIG. 2, depicted is a social pricing system 200 that can be employed in accordance with an aspect of the disclosed subject matter. System 200 can include a plurality of components to facilitate, inter alia, social pricing and/or to mediate interaction between sellers and buyers, typically in connection with and/or operatively coupled to deal room 110 of FIG. 1. In particular, system 200 can include seller interface component 210 and buyer interface component 212. These interfaces 210, 212 can provide suitable mechanisms to facilitate registration for sellers and buyers, respectively. For example, a plurality of mechanisms can be utilized to collect information about/from sellers or buyers (e.g., name, address, billing information . . . ).

In one embodiment, one or more wizards can be provided to assist buyers or sellers with the input or collection of such information. In one particular instance, seller interface 210 can include one or more mechanisms to help the seller offer products for sale. For example, the interface 210 can aid specification of a sales unit (e.g., piece, box, barrel . . . ), minimum/maximum orders, product options, deliver choices, offer length (e.g., hours, days . . . ), discount offers (e.g., coupon! discount codes), commissions, public/private offers, price schedule, buy-it-now price, marker placement (start at a particular price tier), first buyer discounts, and/or rules or preference to facilitate automatic store front generation, among other things. Further yet, seller interface 210 can similarly be employed to later adjust the terms of the offer, if so desired.

It is also to be noted that the interface components 210 and 212 can provide customizable dashboards for buyers or sellers, which, among other things, can present valuable information thereto in an intuitive manner. For example, and not limitation, a buyer dashboard can include historical information about purchases, automated purchase criteria, and active offers of interest. In one or more aspects, the buyer dashboard can be formatted as, e.g., a banner ad or popup or widget. Accordingly, the buyer dashboard need only occupy a small amount of screen real estate, but can still deliver (potentially in a configurable manner) all the relevant information of the offer. For example, current discount, link to place an order, use a card or coupon code, share with others, get a final price, download the stored value of the transaction (potentially along with additional details), and so on. Appreciably, this banner ad (or other mechanism) can be embedded into a social network 120 in a manner similar to social pricing apps. Hence, potential buyers who are, e.g., still on the fence about whether or not to commit to a purchase can monitor the action and excitement of the offer by visiting page of a prosumer (and likely friend) who has embedded the banner ad.

Similarly, a seller dashboard can include information about visitors (e.g., top visitor locations), prosumers, orders, current inventory, production capacity, production schedule, and/or other key performance indicators. In one instance, a number of graphical elements can be utilized to render such valuable information including various graphs and charts, among other things. These and other mechanisms can also be employed to filter or sort a variety of information in various manners to allow users to acquire significant information from such mechanisms. Appreciable, with the potential wealth of information available, the host can be afforded a powerful opportunity to present advertising opportunities to both buyers and sellers. For example, the host can offer targeted advertising or ads to either buyers or sellers based on history statistics, search, location, and so forth. For instance, sellers can be informed automatically primed on potential deals based upon a number of prospective buyers in certain locations, while buyers can be proactively served deals based upon their own geographic location. Moreover, by utilizing product interest data or inferences to drive ads, more effective display or ad selection can be effectuated.

For example, in one or more aspects, a seller dashboard (or seller social pricing app) can be provided to support various information and levels of detail about prosumers with respect to products offered by the seller. For instance, a means for contacting the prosumer can be provided (e.g., to indicate appreciation, provide special recognition or other information) as well as a means of providing the prosumers with other additional incentives, such as coupon codes. Another purpose of this feature included on the seller dashboard can be to give sellers the ability to filter or sort those prosumers who have generated the most views, the most orders, the most prosumers, and to visually indicate how each prosumer is connected to others.

For example, any number or variety of representations can be employed such as tables, charts, graphs, trees, maps and so forth. Any suitable representation can thus display metrics indicative of how well offers are performing. In particular, such metrics can relate to, e.g., a total number of orders, total revenue for the day, total number of views, which offers have closed, which offers are still live, a total number of prosumers, various click-through rates, bounce rates, and the like. These and other additional metrics that can be displayed in some manner by the seller dashboard are summarized below in various tables, which are not intended to represent a comprehensive list, as other metrics can be suitable as well. Moreover, certain displayed metrics can relate to multiple or individual products as well as for multiple or individual buyers, and can typically be further filtered by date.

For example, upon selecting a particular offer from the seller dashboard, the seller can be presented with various reports regarding seller and buyer social pricing apps. These reports for the seller social pricing app can appear if the seller shared the seller social pricing app. The reports for the buyer social pricing app can appear if at least one of the seller's buyers shared the buyer social pricing app. The seller can be able to access reports on offers that are currently live as well as those that have closed. These reports include but are not limited to the following:

Table I, below relates to offers that are live, wherein an associated seller social pricing app will typically display graphical representations the following to the seller:

TABLE I

How many people viewed my App?
How many people clicked through to view my product?
How many people of the people who clicked ordered my product (Conversion Rate)?
The number of people who became a prosumer (e.g., put their own Buyer Social Pricing up on a website) after ordering the product?

TABLE I-continued

The percentage of people who became a prosumer (e.g., put their own Buyer Social Pricing up on a website) after ordering the product?
Additional metrics on the people who view these prosumers' App and purchased themselves, and then whether then whether or not they became a prosumer, and so on.
The dollar amount of sales each prosumer has created?
Where in a geographic sense people viewed and/or purchased my product (e.g., show a heat map that overlays a particular country, city or other geographic region)?
What time of day Buyers saw the App?
How many times a buyer viewed the product description page before ordering?

Likewise, Table II below relates to offers that have closed and therefore generally removed from the seller social pricing app:

TABLE II

How many people viewed my App?
How many people clicked through to view my product?
How many people of the people who clicked ordered my product (Conversion Rate)?
The number of people who became a prosumer (e.g., put their own Buyer Social Pricing up on a website) after ordering the product?
The percentage of people who became a prosumer (e.g., put their own Buyer Social Pricing up on a website) after ordering the product?
Additional metrics on the people who view these prosumers' App and purchased themselves, and then whether then whether or not they became a prosumer, and so on.
The dollar amount of sales each prosumer has created?
Where in a geographic sense people viewed and/or purchased my product (e.g., show a heat map that overlays a particular country, city or other geographic region)?
What time of day Buyers saw the App?
How many times a buyer viewed the product description page before ordering?
Total quantity order for product?
Total number of buyers?
Average quantity ordered by buyers (mean, median, mode)?
What are the relationships and differences between various offers that have closed (e.g., filter and sort function/timeline and/or trend analysis It should be appreciated that buyer social pricing app can display similar items as those noted above with respect to seller social pricing apps.

Furthermore, still referring to a seller dashboard in connection with seller interface component 210, various other metrics can be provided to sellers. For example, the seller dashboard can indicate the seller's top 5 most active prosumers, which can be defined however the seller chooses, such as the top 5 quantity buyers, the top 5 in total activity, the top 5 who lead to the most sales or orders, and so forth in connection with their active offers. A prosumer can be considered active when the offers those prosumers have included in their social pricing applications have not yet expired. The seller dashboard can provide a drop down menu that will allow selection dates for the information in that is to be ultimately displayed. Moreover, the seller dashboard can also provide the ability to sort this table as well as provide the ability to select all or individual prosumers. A Reward button located on the seller dashboard can then allow the seller to send an email or coupon to all selected prosumers. Appreciably, displaying information relating to prosumers need not be with respect to active or current or recent offers, but can also relate to, say, the seller's top 5 prosumers of all time, or with respect to certain product categories, and so forth.

Hence, the seller dashboard can display items such as, e.g., a username of prosumers, activity to date for offers submitted by the seller, a total amount each prosumer has personally spent on the seller's products, a total amount spent on the seller's products that were initiated by activities of the prosumer, or any of the above with respect to a particular category or class of product, as well as a reward link to allow transmission of a message or coupon code or the like. In addition, the seller dashboard can also provide an option of adding prosumers to a future watch list, which can be employed to track various prosumers, typically to later engage or reward them.

Although not necessarily limited to a particular form, often, such rewards will take the form of coupon codes. Moreover, coupon codes can apply to all (or some subset) buyers or merely to selected buyers or selected prosumers. Coupon codes can operate to reduce the final price after the offer closes by a predetermined percentage, by a predetermined notational value (e.g., dollar amount), or operated to provide other economic advantages such as free shipping, extended warranty, and so forth. In some cases, an alert can be delivered to the seller illustrating the effects the coupon code will likely have on the initial price curve.

In one or more aspect, the seller dashboard can allow the seller to limit the number of uses or iterations of a particular coupon code, which can further encourage immediate buying. It should be appreciated that a coupon code can be applied to substantially any offer that is live as well as substantially any offer that is scheduled for an upcoming date.

Figure 3:
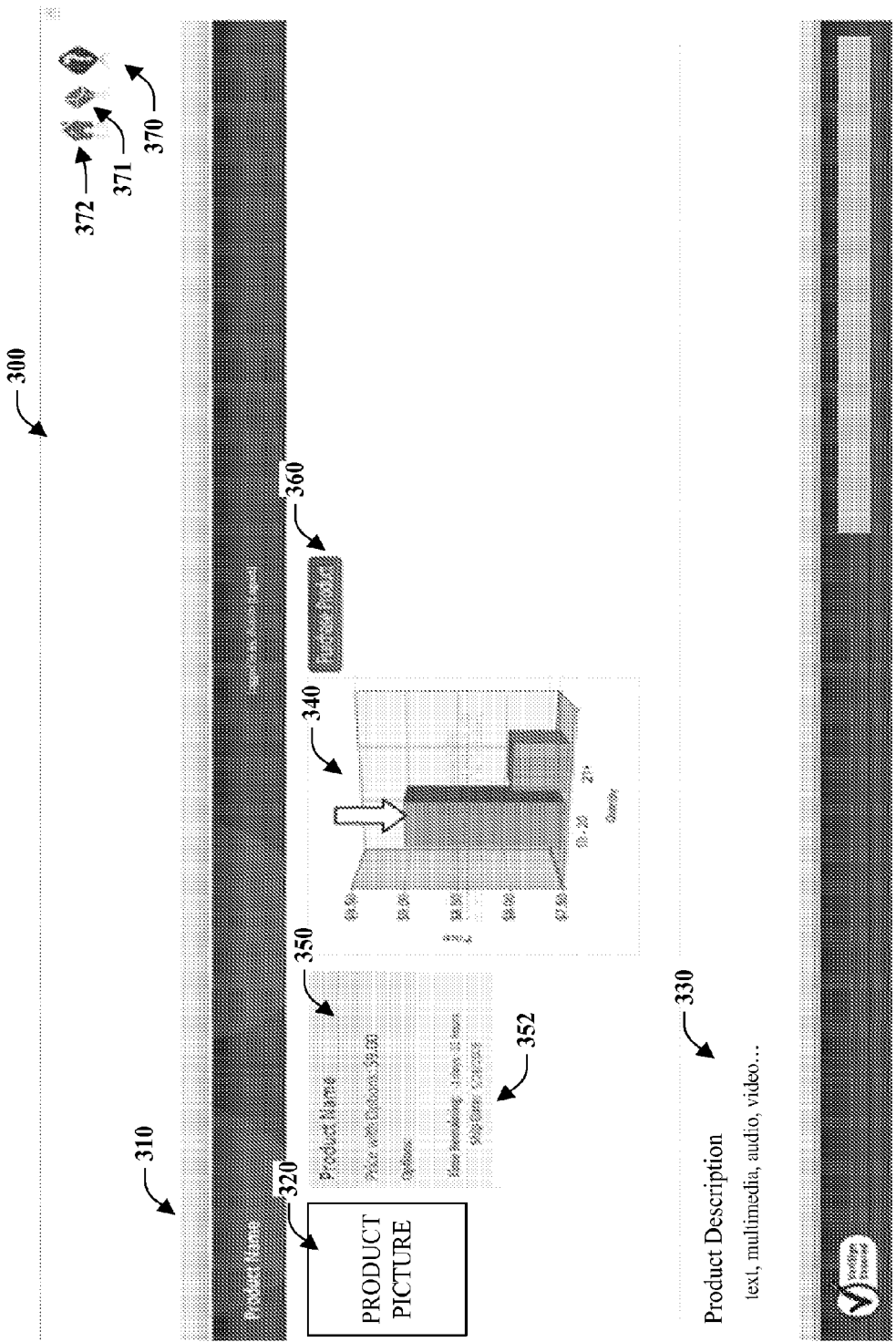
FIG. 3 is a screenshot of an exemplary deal room in accordance with an aspect of the disclosure.

System 200 can also include, deal room constructor component 214, which can utilize information specified by the seller to generate and subsequently activate a deal room (e.g., deal room 110 of FIG. 1). Turning briefly to FIG. 3, example screenshot 300 of an exemplary deal room that can be generated by component 214 is illustrated. Here, a product name 310 is displayed in the upper left corner with a picture of the product 320 situated below. A description of the product 330, which can include any combination of text, audio, and/or video, is also provided in toward the bottom left corner.

Figure 4:
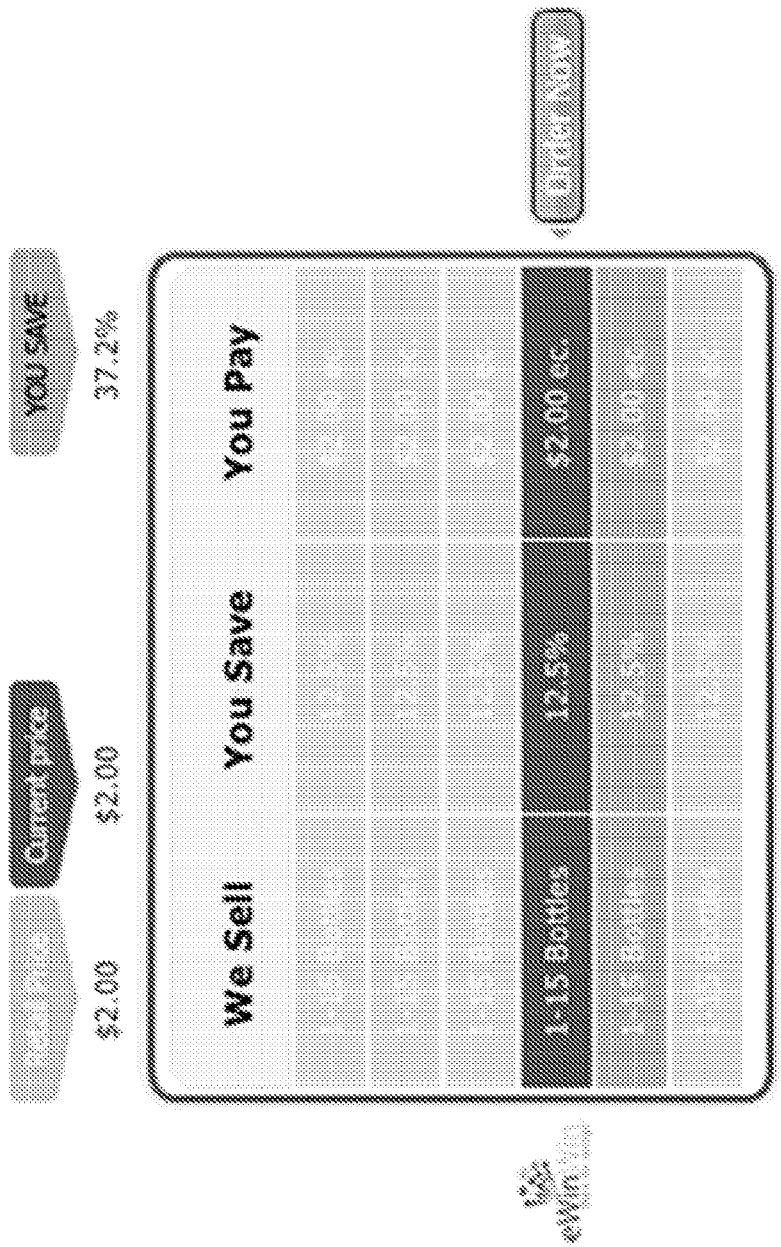
FIG. 4 is a price schedule represented as a table according to an aspect of the disclosure.

A price schedule 340 is graphically depicted close to the middle of the page. Here, two price tiers are shown, one for purchase of 10-20 product units and another for purchase of over 21 product units. Although depicted here as a three-dimensional graph, it should be noted that the price schedule 340 can take any number of different forms including, amongst others, a price curve and a table. Further additional information can be provided such as the amount (or percentage) saved at each tier, for example as shown in FIG. 4. In addition, in FIG. 3, an arrow (or some other visual indicia) can indicate that current pricing for the product is the first tier.

Further, graphical element 350 is provided to allow specification of particular product options. For example, where a picture is for sale, various sizes, and/or frames can be made available as options. The price with options can be displayed therein. Beneath element 350, at 352, the time remaining and ship date can be specified. Button 360 can also be provided, e.g., as depicted next to the price schedule to initiate purchase of a product. Further still, various icons/links can be provided to initiate, e.g., help 370, send email 371, and return to a home page 372. Of course, screenshot 300 is only exemplary. It is to be appreciated that many different combinations of interface elements and functionality can be provided within the scope and spirit of the described subject matter.

Returning to FIG. 2, recommender component 216 can provide, among other things, product recommendations to buyers as a function of, e.g., a particular product of interest. For example, a product recommendation can be made by component 216 based on a product category associated with a currently viewed and/or purchased product. In this way, additional sales including cross selling opportunities can be encouraged. Furthermore, the recommender component 216 can provide a mechanism to receive user feedback and/or product ratings to aid a purchase decision. Optionally, reputation management functionality can be incorporated or otherwise employed with respect to users to further facilitate a purchase decision.

The recommender component 216 can provide recommendation to sellers as well. For example, smart recommendations can be provided on pricing, and/or durations of offers among other things. Although not limited thereto, in one embodiment, such recommendations can be inferred and/or otherwise determined utilizing various analytics based at least on historical market data and optionally on contextual data/information. Further, recommender component 216 can operate in connection with deal room constructor component 214 to, e.g., facilitate automated construction thereof as a function of one or more recommendations.

System 200 can also include analysis component 217, which can analyze all or a portion of potential buyers and/or product markets, among other things, to assist a seller in offering a product for sale. Moreover, analysis component 217 can receive, retrieve, or compute various metrics. For instance, analysis component 217 can facilitate identification, collection, or storage of the following metrics for sellers: total number of orders, total revenue for the day, total number of views, which offers have closed, which offers are still live, total number of prosumers, percentage of people who became prosumers, which prosumers brought in the most revenue, which consumers had the most impressions, click through rate (CTR), or bounce rate.

Further, the analysis component 217 can facilitate provisioning of a default pricing option for automated pricing or recommendation based on the current market, recent market, or forecasted market for a particular product. Additionally or alternatively, sensitivity analysis can be performed and potentially return computed-based inferences on a proposed offer. Still further yet, it should be noted that various simple or advanced analytics can be performed by analysis component 217. For example, trend analysis can be utilized to determine how particular social networks and/or prosumers are performing with respect to promotion and purchase of one or more seller products.

To provide a concrete example of the functionality of analysis component 217, consider following. Analysis component 217 examines and/or parses comments made about an offer from different groups of buyers, possibly based upon demographics or other known characteristics. Based upon such analysis component 217 can infer how a target demographic might respond to a similar (or disparate offer). Hence, analysis component 217 can substantially infer various probabilities of success for any given offer set forth by a seller. Additionally or alternatively, analysis component 217 comments (e.g., positive or negative on the offer/product, particular words used, responses thereto) with respect to a particular offer or product. Based upon such examination, the influence exerted by particular individuals who made comments can be tracked or measured.

Naturally, certain individuals (e.g., mavens) can be found who exert substantially more influence over others than the average case. Thus, how a maven reacts to a particular offer (or similar previous offers) can be employed to infer how well the particular offer will do. Therefore, upon constructing an offer, the seller can be informed of this information prior to posting the offer to a deal room, and therefore be able to employ the delivered information to intelligently modify the offer. For example, in one or more aspects, the seller can plug in a product database and/or business model. In response, analysis component 217 can examine all available relevant data to output, e.g., "if you offer a certificate/voucher of $20 face value for $10, have the offer expire in 3 days, then the odds of you getting 750 people to purchase, 20% of whom are new fans is 56%. If the offer is lowered from $10 to $9, analysis component 217 can indicate, e.g., that the probability rises to 82%, and so forth. Moreover, analysis component 217 can be employed to automatically optimize offers for a given criterion, such as, e.g., profitability, brand awareness, or another focus determined by the seller.

In one or more aspects, analysis component 217 can model a suitable profile for mavens with respect to the seller's product domain. Such modeling can relate to, e.g., types of words used, types of common activities, frequency of activity, number of contacts, tools or settings used for a deal room or an associated social network, character of replies to the maven, or the like. Based upon this model, analysis component can identify other potential mavens, e.g., those in the seller's geographic region. Hence, the seller can be apprised of a potentially very customer base, provided by the inferences of analysis component 217.

It should be appreciated that inferences can be employed to identify a specific context or action, or can generate a probability distribution over states, for example. The inference can be probabilistic—that is, the computation of a probability distribution over states of interest based on a consideration of data and events. Inferences can also refer to techniques employed for composing higher-level events from a set of events and/or data.

Such inferences can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naive Bayes, Bayesian networks, decision trees, neural networks, fuzzy logic models, and probabilistic classification models providing different patterns of independence can be employed. Classification as used herein also is inclusive of statistical regression that is utilized to develop models of priority.

Automated order component 218 can automatically facilitate purchases of products and/or place orders for products as a function of buyer specified criteria. For example, a particular buyer can specify, utilizing buyer interface component 212 for instance, particular product quantities, price points, or delivery dates. In one instance, such information can be provided with respect to a subscription. The automated order component 218 can also monitor offers for products and if an offer matches buyer specified criteria, an order can be automatically executed and shipped.

Search component 220, which can provide search functionality over a plurality of products offered for sale with respect to the social pricing system 200. Accordingly, buyers can employ the search functionality (via interface component 212, for example) to locate products of interest. As well, sellers can search products to identify competing offers, hot products, among other things.

Data collection component 222 can collect a plurality of data surrounding the sale of a product. For example, product sales can be tracked by seller, product, category, or the like and demographic information recorded about particular buyers (e.g., gender, age, ethnicity, marital status, religion, education, income . . . ) and other contextual information (e.g., date, time, day of week, season, weather, events . . . ). Such data can subsequently or concurrently be employed by other components to improve shopping experience. In one instance, such information can be utilized to populate key performance indicators (KPIs) specified on a seller dashboard or interface and/or afforded to analysis component 217 for processing. As one example, demographic and other information relating to buyers or potential buyers can be obtained from social networking platforms such as social network 120 of FIG. 1.

Import/Export component 224 can provide a mechanism to aid importing or exporting information with respect to the social pricing system 200. By way of example and not limitation, data can be exported to web services, RSS/XML feeds, particular applications (e.g., spreadsheet, inventory management system), or the like. Similarly, data can be imported from particular applications of sources (e.g., inventory management system, product catalog . . . ). Consider a company with many products, for example. Rather than inputting each product individually, import/export component 224 can enable an entire product catalog to be imported. Furthermore, import/export component 224 can operate in combination with other components to, e.g., aid automated deal room construction. In accordance with one aspect, a business can be easily import numerous products and a virtual storefront including a specific uniform resource locator (URL) and product offers can be generated automatically or semi-automatically (e.g., inferences, rules, manual input . . . ).

In more detail, import/export component 224 can, in one or more aspects, provide an ability to extract product database information from a client or vendor site (or other data repository) and import such data into a new database resident on a hosted server. Additionally, import/export component 224 can allow various defaults to be set. For instance, component 224 can pull volume price schedules for any item, such as 1-3 units=$20, 4-6 units=$19, and so on. Such can be accomplished by product, and can even distinguish based upon various classes or categories. Hence, import/export component 224 can pull a price list for "distributors" and a different price list for "resellers" and so on. Regardless, the pulled data can automatically feed a storefront with product, description, image, price curve or table, offer period, ship date, etc. Moreover, such can be performed rapidly, in an automated manner, and can even be allocated a unique URL associated with the managing entities, with items displayed according to the storefront selected. Furthermore, import/export component 224 can provide the ability to take the base volume prices for all items and add a predetermined (possibly product/category specific) markup to all (or a subset of) items before feeding into the selected price curves, for instance, by adding 5% to all products at all price curves.

Similarly, import/export component 224 can facilitate an application of certain incentives (e.g., coupons, discounts . . . ) to specific items, categories of items, subcategories of items, or the like, all or a portion of which can be on top of or in lieu of the determined price curves. Such features can imbed additional flexibility into the host platform by, e.g., enabling the seller to further customize the storefront, or multiple storefronts, accordingly. Moreover, import/export component 224 can feed, sort, and/or display imported data by substantially any pivot such as, e.g., product category, type, UPC number, and so forth. Moreover, specific offers or a group for a sub-criteria, can be subject to further analysis, to feed business intelligence, recommender systems, smart pricing, or the like.

The above-mentioned storefront can be equipped with a "Shopping cart" function (e.g., via cookies or related mechanisms) and tagged per user so that future visits can automatically pull earlier products and prices, coupons, etc., and can be utilized to incorporate a new distinct storefront with select items based on business intelligence and/or recommendation algorithms. Again, the items displayed, availability, price curves, coupons, can all change in unison based on the unique buyer on the site as can what is ultimately delivered as part of that shopping experience.

For example, if a buyer orders from the storefront and then proceeds to become a prosumer by, e.g., placing a social app on his/her social networking page, the seller can be notified of this event and can respond with unique offers directly to that person and/or to their social network. As more buyers click through this link, the group's activities can be recorded, as well as an identity or profile of the various individuals. This information can be further refined over subsequent visits to support proper profiling, which can then be used to generate smart storefronts, pricing, incentives, and recommendation systems to increase the value of the service for both buyer and seller.

Data store(s) 226 provide a mechanism to persist and retrieve data. For example, the data store(s) 226 can electronically house all product offers and make them available for retrieval utilizing the search component 220. Further, all or a portion of information collected by data collection component 222 can be housed by data store(s) 226. As well, component 224 can utilize the data store(s) to import and/or export data. In other words, data store 226 is intended to be a repository of all or portions of data, data sets, or information described herein or otherwise suitable for use with the described subject matter. Data store 226 can be centralized, either remotely or locally cached, or distributed, potentially across multiple devices and/or schemas. Furthermore, data store 226 can be embodied as substantially any type of memory, including but not limited to volatile or nonvolatile, sequential access, structured access, or random access and so on.

Access component 228 can control access to the social pricing system 200 or particular portions thereof. In other words, access component 228 can act as a authorization mechanism. In this manner, offers can be limited to registered users of social pricing system 200, or in accordance with terms or conditions set by an entity (e.g., buyer or seller) who constructs a particular deal room. Further, some offers can made public such that any member of the public can view the offer, while other offers can be private and potentially inaccessible to any but approved users, for example. In one instance, terms and conditions can be specified, satisfaction thereof allowing entrance into a private deal room. For example, a prosumer may be provided access to a private deal room with a more advantageous price schedule for a product after generating a set number of other prosumers.

Port component 230 can operate as a mechanism that allows at least a portion of the functionality provided by the social pricing system 200 to be ported to particular devices, applications, environments, or the like. In this manner, social pricing can be integrated with most any other context or suitable platform.

Turning attention to FIG. 5, a representative port component 230 is illustrated in accordance with the disclosed subject matter. In one instance, a portable chunk of code can be produced and provided for execution within a particular application (e.g., web browser) and/or environment (e.g., social network). In particular, components 510 and 520 provide widgets and applets for download and/or use. In one embodiment, such widgets and/or applets can provide promotional functionality as well as real time updates in connection with deal room activity. For example, an applet can be dropped on a social networking page, which identifies a particular product being offered for sale with social pricing and can further provide a link thereto to effect a purchase. Moreover, the widget/applet can present updated information such as current pricing, rice breaks, quantity sold, discounts to date and those that can be obtained, probability of reaching price breaks, time remaining for the offer, to name but a few examples. Additionally or alternatively, discount codes or a link can be provided to encourage a purchase as well as configurable product search or watchlists.

Further yet, mobile interface component 530 can be downloaded and/or otherwise employed by a mobile device (e.g., phone, tablet, terminal . . . ) to facilitate interaction with the social pricing system. For example, a mobile interface or dashboard can be provided that is specifically constructed (e.g., in terms of form factor, processing, bandwidth . . . ) for use on a mobile phone or other mobile device. Additionally or alternatively, such functionality can be embodied as a mobile device application.

Stated differently, the widgets, applets or other small applications can act as a dynamic billboard where various information can be provided. Furthermore, the widget or the like can update information in real-time. For example, the most current unit price can be updated as it changes in accordance with a schedule and current volume purchased. Additionally, remaining time can be updated such as the number of days or minutes left before expiration of an offer. Sellers can also offer discounts in real time to encourage purchases. By way of example, special coupons and/or codes associated therewith can be provided for use on orders placed in the next five minutes (e.g., flash offers). Still further, yet, the widget can provide the ability to provide feedback to sellers in real-time. For instance, product description errors can be noted, questions asked regarding a product, suggestions made pertaining to a current or future price curve, and/or various other suitable elements. Furthermore, search functionality can be provisioned to enable identification of one or more similar or dissimilar group purchase opportunities.

Figure 6:
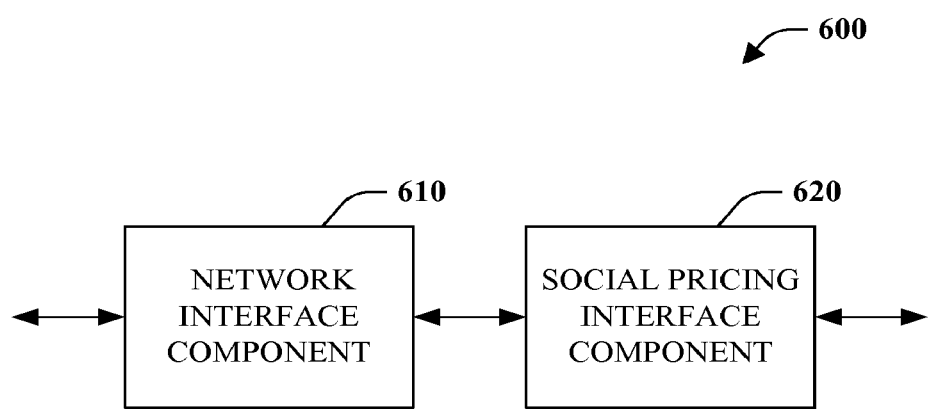
FIG. 6 is a block diagram of an interface in accordance with an aspect of the disclosure.

FIG. 6 depicts an interface 600 that can be utilized to enable interaction with a social pricing system in accordance with an aspect of the disclosed subject matter. For example, such an interface can correspond to an application programming interface (API) utilized by an applet or widget, among other things. In one particular, instance the API can be employed to ping a database and/or enable pushing or pulling of information such as current unit price, or remaining offer time, among other things. As shown, the interface 600 can include a network interface component 610 and a social pricing interface component 620. The network interface component 610 can receive information from and can provide information to a network (e.g., social network, affiliate network . . . ), portion thereof, or another application in accordance with a specific protocol. The social pricing interface component 620 can provide information and can receive information with respect to and in a manner specified by a social pricing system such as system 200 as described with respect to FIG. 2. The network and social pricing interfaces can then communicate with one another in a manner that allows different communication protocols, procedures, or the like to be bridged. In this way, a social or affiliate network (e.g., wherein the affiliate can paid as for promotion and/or purchases) can interact with a social pricing system.

Figure 7:
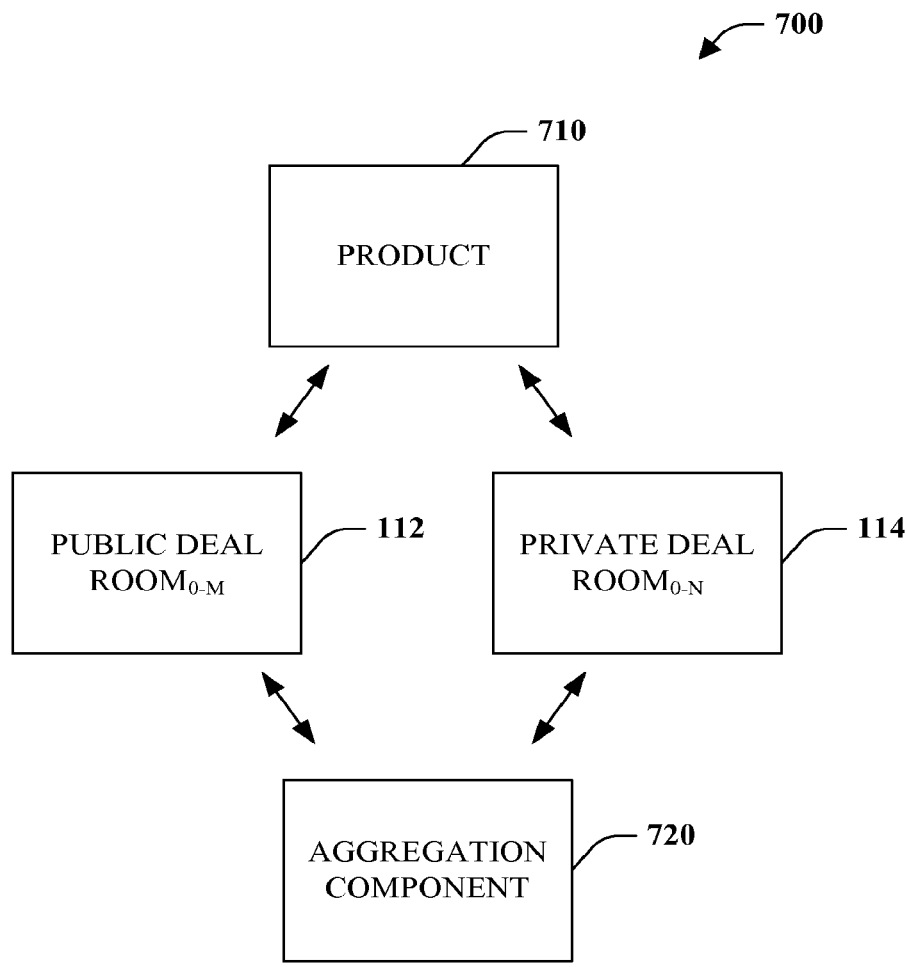
FIG. 7 is a block diagram of a system for aggregating purchases across deal rooms in accordance with an aspect of the disclosure.

FIG. 7 illustrates system 700 for aggregating purchases in accordance with an aspect of the disclosed subject matter. In accordance with one or more aspect, a product 710 can be offered for sale in at least one deal room. More specifically, the product 710 can be offered for sale in at least one of M public deal rooms 112 or in at least one of N private deal rooms 114, where both M and N can be any positive integer, and where deal rooms 112 and 114 are substantially similar to and/or can be represented by deal room 110 of FIG. 1. Any given deal room, whether public or private can include a specific price curve or price schedule associated therewith. In one embodiment, a public deal room 112 can be provided to offer a product for sale to the general public. Likewise, a private deal room 114 can be established to offer the same product for sale to prosumers who have earned or otherwise qualify a particular level (e.g., based on promotional efforts . . . ), which can apply to any entity, such as, e.g., companies and/or other special individuals or organizations. In the above-mentioned case, it is likely that the private deal room 114 will have better price curve and/or additional benefits not available in a corresponding public deal room 112, however, such need not necessarily be the case.

Regardless, the product quantities ordered through all or a subset of each public deal room 112 and all or a subset of each private deal room 114 can be combined by aggregation component 720 (which can also be included in social pricing system 200). Hence, the final price per unit for the offered product can be based on the total quantity ordered with respect to both public and private deal rooms in accordance with a price schedule associated with each room. Appreciably, all other things being equal, buyers from public deal room 112 can end up paying a different price per unit than do buyers employing private deal room 114, even though both utilize the same aggregate volume of total units ordered (since the price curves for each can differ).

To facilitate clarity and understanding, the following non-limiting example is presented. An individual can identify or otherwise become of aware of a product offered for sale by a seller offering a volume discount. For example, he/she can become aware after searching for a product or be informed by a friend or family member via written or verbal communication and/or by way of a widget or applet on a networking site. The individual can then purchase a quantity of the product for at most the current price according to a price schedule. At this point, the individual becomes a consumer and can be obligated to buy the product at the initial price agreed upon, but with additional orders from others, may well end up paying a final price that is lower than the initial price (in accordance with a given price curve).

Thus, to obtain a lower price, the consumer can promote purchase of the same product to colleagues, friends, family, or others. For example, the consumer can acquire a widget, applet, or other application and place it on one or more of his/her social networking pages or other websites. The widget can be network agnostic and can provide a means for directing others to a location (e.g., deal room 110, 112, 114) where the product can be further examined and/or purchased. By promoting the purchase of the product, the consumer becomes what is deemed a prosumer. While a prosumer can be motivated by self-interest to obtain the lowest price possible on the product, the prosumer can also be subject to altruistic motives as well, such as to inform friends, family, or other contacts of the best deal. Regardless, the prosumers can be provided additional motivation beyond those listed above to continue to promote purchase of products, which can be initiated by sellers or other interested parties by way of offering, e.g., additional discounts, entry into private deal rooms, points, gift cards, and/or other incentives. At the expiration of an offer, consumers can be charged the lowest unit price reached by aggregating all consumer purchases. Some consumers may obtain additional price breaks as a function of one or more discounts acquired by that consumer, for example as a function of prosumer activity.

Further, it should be noted that social network providers themselves (or even prosumers, prosumer groups or organization, etc.) can offer discounts, host a sale, and/or provision widgets or the like to members, so it should be appreciated that incentives are not merely limited to sellers. This can be done to increase traffic and/or social network membership for a particular provider. Further, sellers can enter into agreements with one or more particular network providers. These agreements can be structured to afford additional discounts or other incentives to members of the network provider for its role in promoting purchase of a product, which can then be passed on to social network members. Additionally, buyers or prosumers can be incentivized to promote a purchase on a particular social network by offering a discount, for example.

Further yet, the disclosed social pricing system can be employed in conjunction with various resellers alone or in combination with other prosumers. For example, affiliate networks or the like can be provided with a commission as a function of sales completed through or with the aid of the network, click through rates, or other metrics.

Reward based incentive programs can be implemented by social network providers, affiliate network providers, among others in which individuals earn points or the like which can be utilized to purchase items, earn discounts, or acquire privileges, among other things. In this manner, a further incentive can be provided to increase traffic of deal rooms and social network platforms, and buyers of products.

Still further yet, it should be appreciated that a broker and/or other third party to a transaction can verify or certify proper operation. In other words, a transaction can be analyzed to ensure that a seller is providing buyers with a group discount in accordance with a provided price schedule, among other things. Such a certification, verification, seal of approval can be provided to particular sellers and/or deal rooms to assure consumers that they will receive a deal as promised.

The aforementioned systems, architectures, and the like have been described with respect to interaction between several components. It should be appreciated that such systems and components can include those components or sub-components specified therein, some of the specified components or subcomponents, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, as will be appreciated, various portions of the disclosed systems above and methods below can include or consist of artificial intelligence, machine learning, or knowledge or rule based components, subcomponents, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

In view of the exemplary systems described supra, methodologies that may be implemented in accordance with the disclosed subject matter will be better appreciated with reference to the flow charts of FIGS. 8-11. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Figure 8:
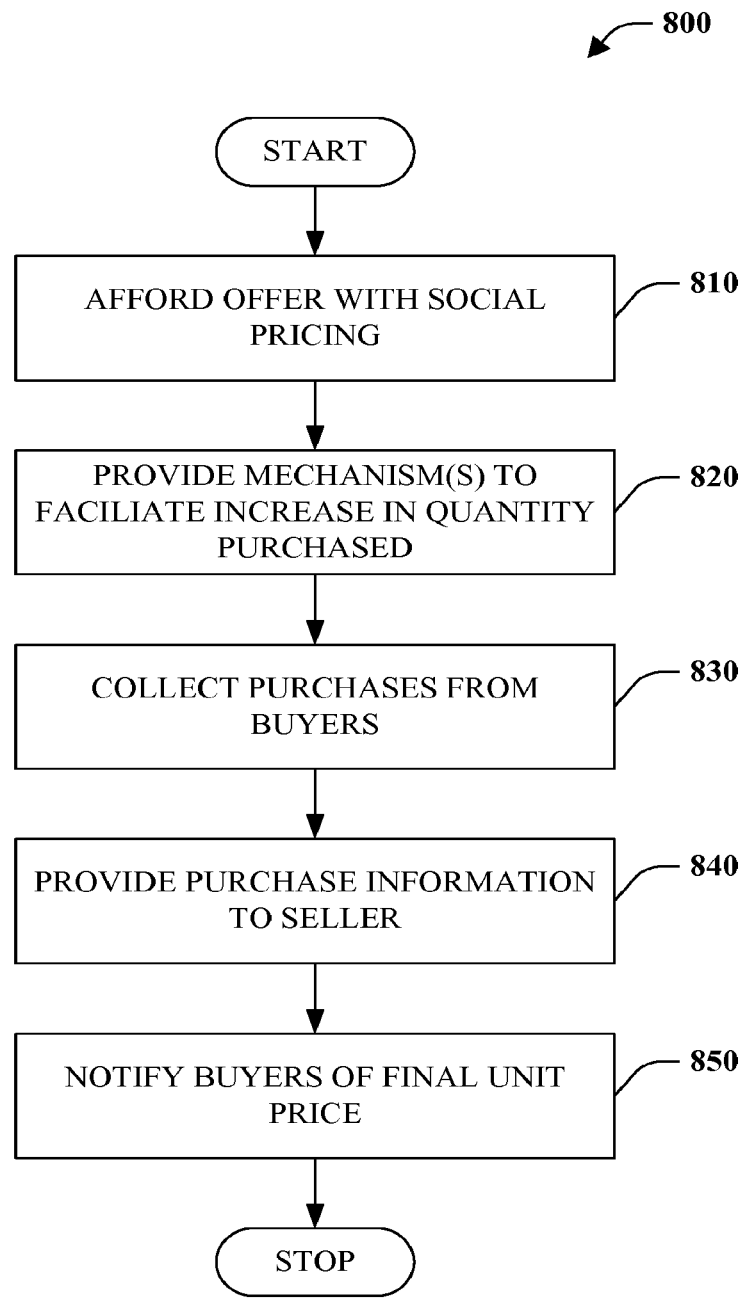
FIG. 8 is a flow chart diagram of a method of selling a product in accordance with an aspect of the disclosure.

Referring to FIG. 8, a method of selling a product 800 is illustrated in accordance with an aspect of the claimed subject matter. At reference numeral 810, an offer is afforded with social pricing. At 820, one or more mechanisms are provided to facilitate promotion or an increase in quantity purchased. For example, such a mechanism can include an applet or widget for inclusion on a social network. At numeral, 830 purchases are collected from buyers. Purchase information is provided to a seller at reference 840, and buyers are notified of a final unit price based on the total quantity purchased at 850. Discounts provided to buyers for various reasons can also be taken at this time.

Figure 9:
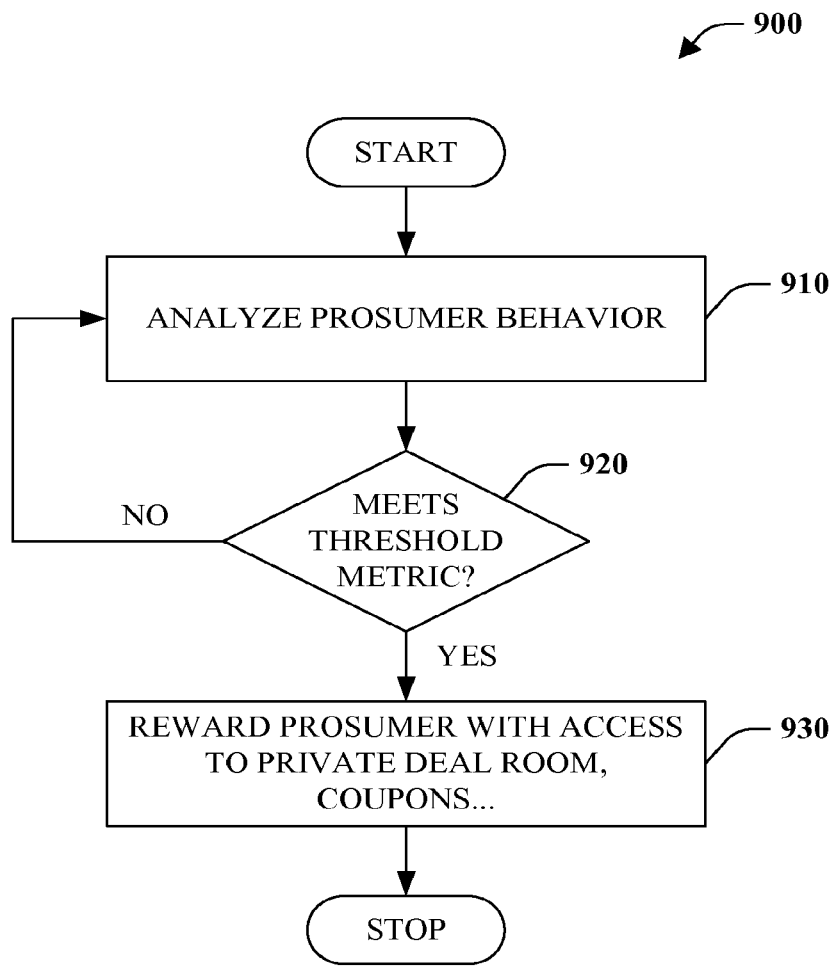
FIG. 9 is a flow chart diagram of a prosumer analysis method in accordance with an aspect of the disclosure.

FIG. 9 a method of prosumer analysis 900 is illustrated in accordance with an aspect of the claimed subject matter. At reference numeral 910, a prosumers behavior is analyzed. More particular, their promotional accomplishments are analyzed. At numeral 920, a determination is made as to whether or not a particular prosumer meets one or more threshold metrics. If no, the method 900 loops back to numeral 910. If yes, the method continues at reference numeral 930 where a prosumer is rewarded with access to a private deal room, and/or discount coupons/codes, among other things as a function of promotional efforts. For example, prosumers can be assigned a level (e.g., A-C, 1-10 . . . ) based on promotional efforts wherein particular leveled prosumers are provided with specific perks/benefits.

Figure 10:
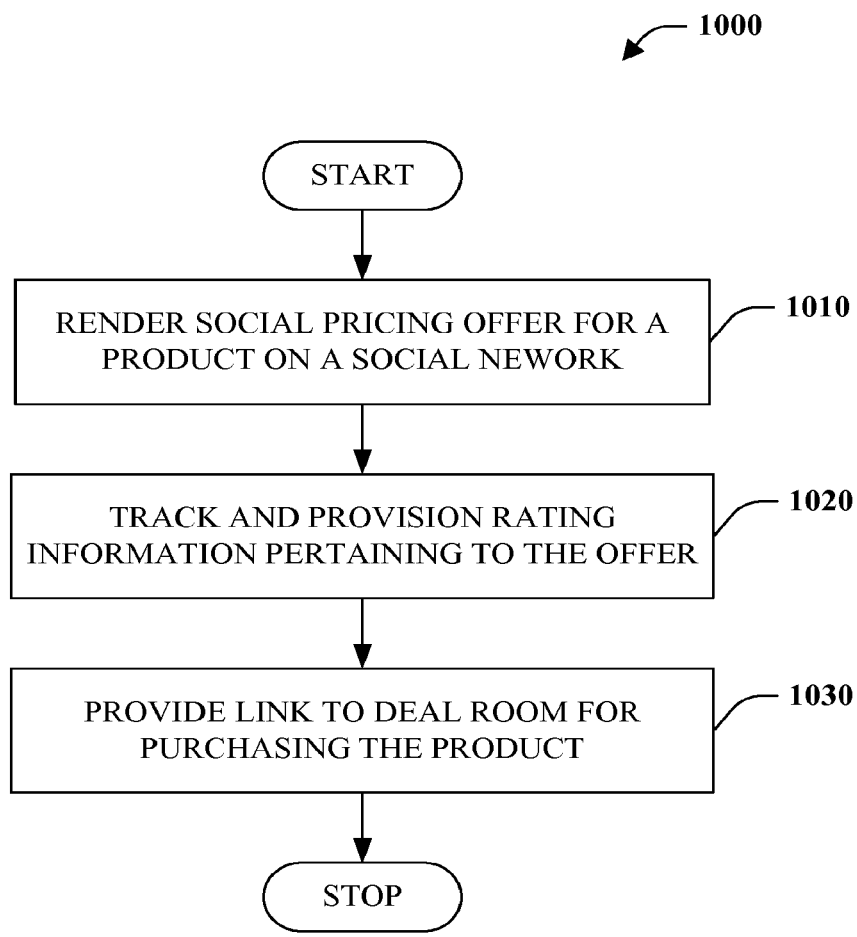
FIG. 10 is a flow chart diagram of a product promotion method according to a disclosed aspect.

FIG. 10 is a method of product promotion 1000 according to an aspect of the claimed subject matter. At reference numeral 1010, a social pricing offer for a product is rendered on a social network. For example, a promotional widget can be added to a user's webpage or the like. At 1020, information pertaining to the offer and/or product is tracked and provisioned. For example, the number of clicks, impressions, click through rate, purchases, and/or the like can be tracked. Furthermore, users can rate the offer on a scale from one to ten, utilizing a five star system, or the like. At reference 1030, a link can be provided to a deal room for purchasing the product.

Figure 11:
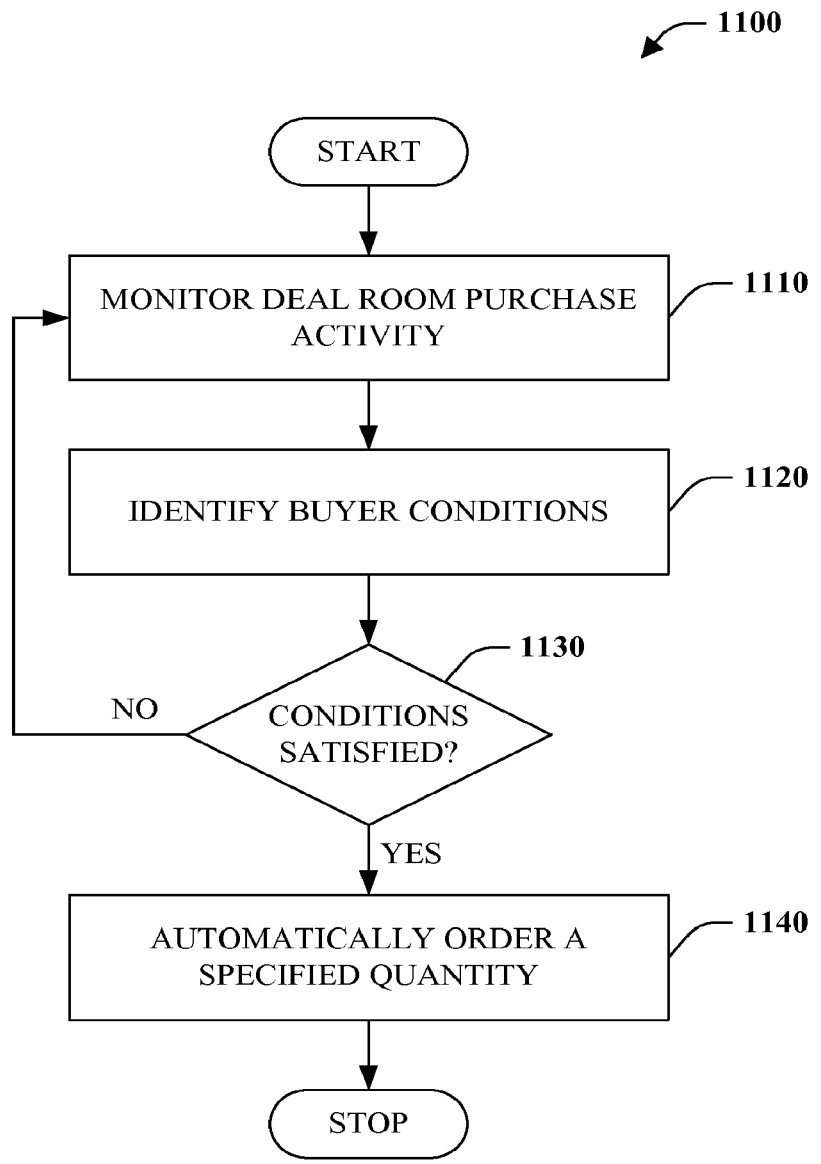
FIG. 11 is a flow chart diagram of a method of automated order execution in accordance with a disclosed aspect.

FIG. 11 is a flow chart diagram of a method of automated purchase execution 1100 in accordance with an aspect of the claimed subject matter. At reference numeral 1110, deal room purchase activity is monitored, and buyer conditions are identified at 1120 (e.g., delivery date, price point, units until next level . . . ). A determination is made at reference numeral 1130 as to whether buyer specified conditions or criteria are currently satisfied. If the conditions are not satisfied, the method proceeds back to 1110 to monitor activity. Otherwise, where the conditions are satisfied, an order for a specified quantity is automatically executed. In other words, a buyer specifies conditions under which he would purchase a product, deal rooms are monitored, and where a match is found an order is placed. In one aspect, such a specification can correspond to a subscription order or automatic reorder and automatic shipping.

It is also to be noted that the social pricing system can interface/interact with inventory management, productions scheduling and/or other seller systems. As a result, sellers can construct profitable offers and increase efficiency. By way of example and not limitation, it if it can be determined that there is a open period between manufacturing runs, a seller an post an offer for products that can be produced during this time. Further, a minimum quantity can be specified to ensure profitability. If the minimum is met, production is run. Otherwise, it is not. Furthermore, a first buyer can be offered a discount or other benefit to get things going and/or a buyer who purchases the minimum quantity can be incentivized. Overall, the seller is able to leverage the social pricing system to make money when he would otherwise simply experience some downtime thereby increasing overall profitability and efficiency.

Discussion has focused primarily on utilizing social networks to provide others an ability to purchase a product such that a group can obtain a volume discount. In particular, widgets, applets or the like can be utilized to provide such functionality. However, other mechanism can also be utilized. For example, the some mechanisms can be utilized with respect to a blog or personal website. Further, different mechanism can be employed depending upon a communication medium. For instance, if widgets are not supported or desired, then links can be utilized to a deal room. Further, short messages can be utilized to promote purchases such as tweets, text messages or the like. In other words, any means can be employed to get the word out virally or otherwise to a particular group.

The term social pricing or the like as used herein refers to group purchases in which a volume discount or cost savings is provided. Social pricing also encompasses demand aggregation as specified herein and with respect to related applications.

As used herein, the terms "component," "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated that a myriad of additional or alternate examples of varying scope could have been presented, but have been omitted for purposes of brevity.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject innovation.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 12:
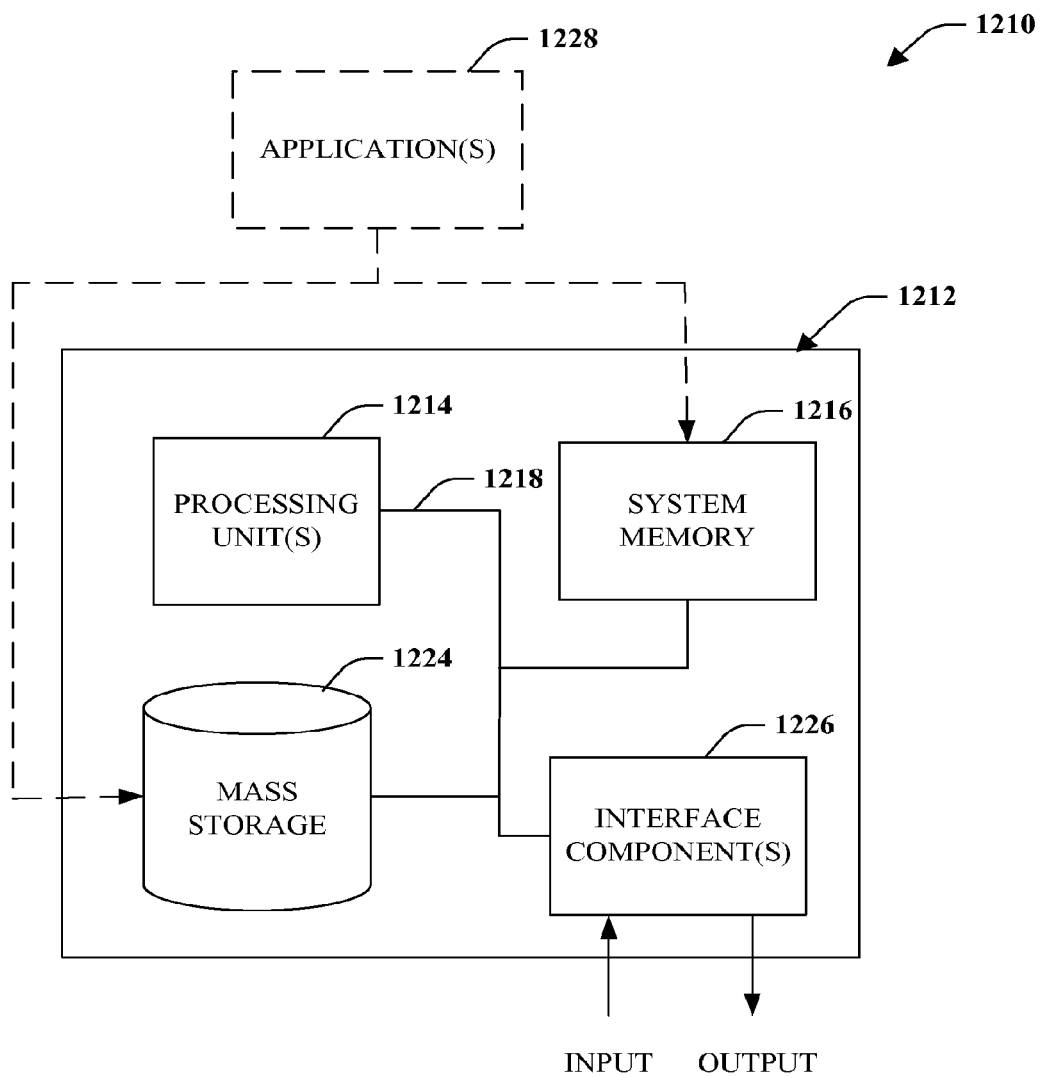
FIG. 12 is a schematic block diagram illustrating a suitable operating environment for aspects of the subject disclosure.
Figure 13:
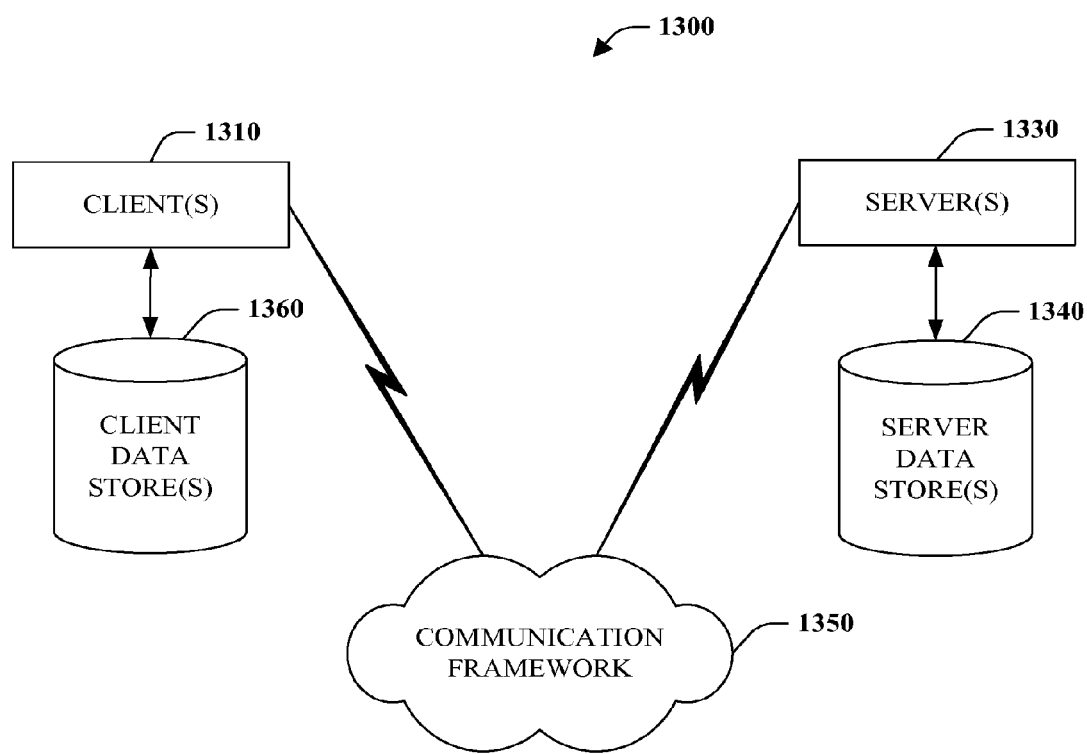
FIG. 13 is a schematic block diagram of a sample-computing environment.

In order to provide additional context for the various aspects of the disclosed subject matter, FIGS. 12 and 13 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the systems/methods may be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

With reference to FIG. 12, an exemplary environment 1210 for implementing various aspects disclosed herein includes a computer 1212 (e.g., desktop, laptop, server, hand held, programmable consumer or industrial electronics . . . ). The computer 1212 includes a processing unit 1214, a system memory 1216, and a system bus 1218. The system bus 1218 couples system components including, but not limited to, the system memory 1216 to the processing unit 1214. The processing unit 1214 can be any of various available microprocessors. It is to be appreciated that dual microprocessors, multi-core and other multiprocessor architectures can be employed as the processing unit 1214.

The system memory 1216 includes volatile and nonvolatile memory. The basic input/output system (BIOS), containing the basic routines to transfer information between elements within the computer 1212, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 1212 also includes removable/non-removable, volatile/non-volatile computer storage media. FIG. 12 illustrates, for example, mass storage 1224. Mass storage 1224 includes, but is not limited to, devices like a magnetic or optical disk drive, floppy disk drive, flash memory, or memory stick. In addition, mass storage 1224 can include storage media separately or in combination with other storage media.

FIG. 12 provides software application(s) 1228 that act as an intermediary between users and/or other computers and the basic computer resources described in suitable operating environment 1210. Such software application(s) 1228 include one or both of system and application software. System software can include an operating system, which can be stored on mass storage 1224, that acts to control and allocate resources of the computer system 1212. Application software takes advantage of the management of resources by system software through program modules and data stored on either or both of system memory 1216 and mass storage 1224.

The computer 1212 also includes one or more interface components 1226 that are communicatively coupled to the bus 1218 and facilitate interaction with the computer 1212. By way of example, the interface component 1226 can be a port (e.g., serial, parallel, PCMCIA, USB, FireWire . . . ) or an interface card (e.g., sound, video, network . . . ) or the like. The interface component 1226 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer, and the like. Output can also be supplied by the computer 1212 to output device(s) via interface component 1226. Output devices can include displays (e.g., CRT, LCD, plasma . . . ), speakers, printers, and other computers, among other things. In accordance with another aspect, it should be noted that one of the interface components 1212 can include one or more antennas for receiving and transmitting wireless communications between and/or amongst other computers, processor based devices, and/or peripherals, among other things.

FIG. 13 is a schematic block diagram of a sample-computing environment 1300 with which the subject innovation can interact. The system 1300 includes one or more client(s) 1310. The client(s) 1310 can be hardware and/or software (e.g., threads, processes, computing devices). The system 1300 also includes one or more server(s) 1330. Thus, system 1300 can correspond to a two-tier client server model or a multi-tier model (e.g., client, middle tier server, data server), amongst other models. The server(s) 1330 can also be hardware and/or software (e.g., threads, processes, computing devices). The servers 1330 can house threads to perform transformations by employing the aspects of the subject innovation, for example. One possible communication between a client 1310 and a server 1330 may be in the form of a data packet transmitted between two or more computer processes.

The system 1300 includes a communication framework 1350 that can be employed to facilitate communications between the client(s) 1310 and the server(s) 1330. The client(s) 1310 are operatively connected to one or more client data store(s) 1360 that can be employed to store information local to the client(s) 1310. Similarly, the server(s) 1330 are operatively connected to one or more server data store(s) 1340 that can be employed to store information local to the servers 1330.

Client/server interactions can be utilized with respect with respect to various aspects of the claimed subject matter. By way of example and not limitation, a server 1330 can afford a social pricing system or service that is accessed by way of a client device 1310 directly or indirectly. Further, the server 1330 can provide or support a social networking application or technology also accessed by individuals via one or more clients 1310.

Figure 14:
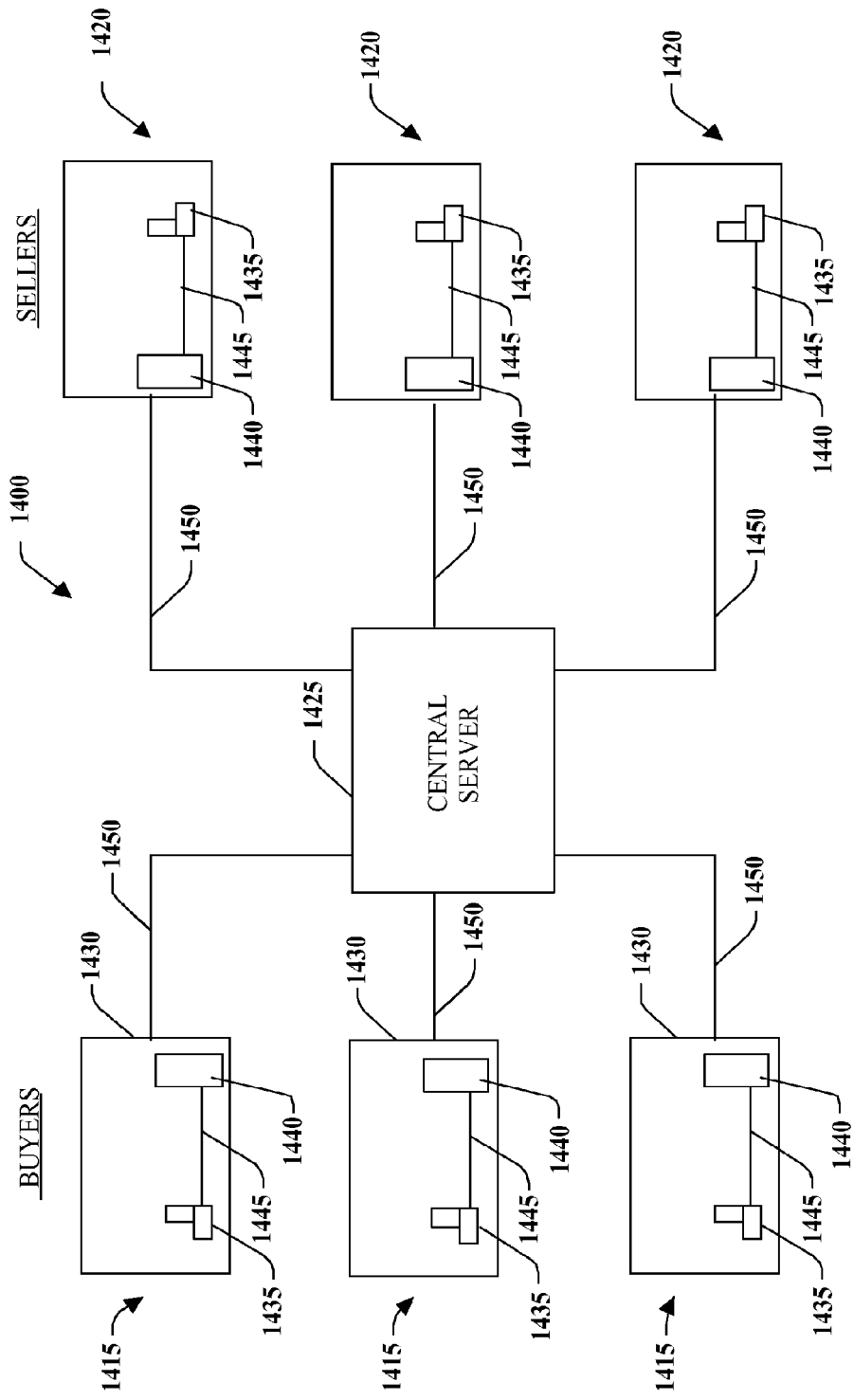
FIG. 14 is a schematic block diagram of an exemplary computing environment for electronically conducting business.

Referring to FIG. 14, an exemplary system 100 for conducting business is shown in which multiple buyers 1415 and sellers 1420 are electronically linked via a central server 1425. The central server 1425 is configured to provide the buyers 1415 and sellers 1420 with a convenient forum in which to buy and sell goods in accordance with a social pricing technology described herein. By way of example and not limitation, the forum can be a pre-established Internet web page where sellers 1420 are able to post product information and the buyers 1415 are able to order the products. The volume-pricing scheme preferably calls for a seller 1420 to post a pricing structure for a product, which provides discounted pricing as more products are purchased during a preset "open session" period (e.g., limited time). Each buyer 1415 is able to place an order for the product during the open session at the then current price. At the end of the open session, the total quantity of products ordered by all buyers 1415 is calculated, and the product is sold to all buyers 1415 at the same lowest price based on the preset price for that quantity amount. In this manner, each of the buyers 115 work together to increase the total quantity of products purchased so that all of the buyers 115 realize discounted pricing due to the cumulative order.

Each of the buyers 1415 and sellers 1420 may access the central server 1425 in any of a variety of ways. For example, in the subject embodiment, each buyer 1415 and seller 1420 is shown to be part of separate establishments 1430, which include one or more respective computer systems 1435 and local servers 1440. The computer systems 1435 may, for example, be a desktop or laptop computer with a local area network (LAN) interface for communicating over a network backbone 1445 to the local server 140. The local servers 1440, in turn, interface with the central server 1425 via a network cable 1450 or the like. It will be appreciated that while the subject embodiment depicts the computer system 1435 communicating with the central server 1425 via hardwired network connections, in an alternative embodiment the computer system 1435 may interface with the central server 1425 using a modem, wireless local area and/or wide area networks, etc. Further, it will be appreciated, that while the buyers 1415 and sellers 1420 are shown to communicate with the central server 1425 via different computer systems 1435, it will be appreciated that the buyers 1415 and/or sellers 1420 may access the central server 1425 from the same computer system 1435.

It should be appreciated that central server 1425 (or managing entity thereof) can provide services to any of buyer 1415 or sellers 1420 in accordance with a contractual agreement. Moreover, central server 1425 can structure agreements in disparate ways for different classes of users or for particular users and so on. For example, central server 1425 can provide various packages such as a "standard" package and a "pro" package (or substantially any permutation thereof or substantially any number of disparate tiers of service), wherein various features can be available only for a particular level of service. One example of such can be found with respect to Table III below, which lists various product features along with an indication of whether or not a particular feature is included in various packages. In this case, only two packages are listed, yet it should be appreciated that others can be included as well, e.g., each reflecting a desired level of service.

TABLE III

| Feature | Standard | Pro |
|---|---|---|
| Concurrent Offers | 3 | 25 |
| First Buyer Discount | Yes | Yes |
| Logins per Company | 1 | 3 |
| Private Offers (Password Protected Offers) | No | Yes |
| Promo Widgets | Yes | Yes |
| View All Items | Yes | Yes |
| Buy-it-now | No | Yes |
| Coupon Codes (Basic) | Yes | Yes |
| Max Offer Length | 3-7 days | 90 days |
| Offer Length Granularity | 1 day | 1 minute |
| Set Starting Price Tier | Yes | Yes |
| View Full Buyer Information | No | Yes |
| Adjust Pricing Downward During Offer | Yes | Yes |
| Advanced Analytics & Reporting | No | Yes |
| Export Data to Excel | No | Yes |
| Advanced Inventory Management (Per Production/Option) | No | Yes |
| Affiliate Marketing | No | Yes |
| Customize Look-and-feel (including Graph) | No | Yes |
| Inventory Management (Per Offer/Option) | No | Yes |
| Limit Orders | Yes | Yes |
| Send Group Email | No | Yes |
| Subscription Orders (Auto Reorder) | No | Yes |
| Coupon Codes (Advanced/Offline Integration) | No | Yes |
| RSS/XML Feeds (Products) | No | Yes |
| Upload Product Catalog | No | Yes |
| XML Web Services | No | Yes |
| Export Data to QuickBooks/Office Accounting | No | Yes |
| Mobile Dashboard | No | Yes |
| Private Offers (User/Role Based) | No | Yes |

Appreciably, solutions described herein can evolve into a working data warehouse to provide business intelligence specifically to individual sellers. One result can be to give sellers as much relevant information as possible about the performance of their offers. Such can include high-level metrics as well as the ability to do a deep dive into specific information, such as that associated with any particular metric. In one embodiment, a seller can purchase access to various functionality or features provided by the seller dashboard or another portion of seller interface component 210 of FIG. 2.

Because such information can represent as substantial revenue opportunity for the seller, the seller will likely find value in purchasing such information. To meet expectations of such value, the seller dashboard can provide accurate, real time metrics in the most usable manner, as substantially described herein. For example, high level metrics can appear on the dashboard tab of the seller dashboard. The idea being that this information is the first thing the seller sees when logging into the system.

In addition, simple intuitive navigation can be provided that allows the seller to drill down into any of the metrics obtain additional information or detail. In particular, design and/or layout of the dashboard ideally will be such that the next likely question a seller would ask can be answered with a single additional click on the seller dashboard. Furthermore, the navigation scheme can be consistent with the remainder of the dashboard in order to add to the intuitive nature of navigation.

Thus, information at every level can be cleanly presented based upon previous experimentation with charts, graphs, tables, and other representations directed to discovering preferred and/or intuitive formats for each piece of data. Accordingly, it can be appreciated that a tool employed to display one particular data set may not be the most usable or likely tool to be selected to display another data set.

Moreover, the seller dashboard (or another suitable component described herein such as import/export component 224) can provide the ability to sellers to export data to another format outside of the host system provided by central server 1425. The most likely formats will be Microsoft Excel or Quicken, but other formats may make sense as well. Accordingly, algorithms for export to popular formats can be optimized and maintained for multiple versions to provide backward compatibility.

In one or more aspects, a trial period can be provided to the seller, for instance to give the seller access to various features prior to purchasing the service. However, upon provision of payment by the seller, which can be negotiated through a broker site, access to the sellers data can be provided immediately. Moreover, data prior to receipt of seller's payment can also be made available to the seller, for example, ten days prior. Furthermore, assuming the service is provided on a subscription basis or is otherwise recurring, then the seller can utilize all purchased tools or data sets for a specified period. At the end of the period, the seller can be charged again, potentially in an automatic fashion.

Among the features that can be provided and/or provisioned on a subscription basis can relate to prosumer activity; past, current, future offers; product mix; and order; and can include at least the following sub-features:

Analysis of Prosumers
    Dimensions of Prosumers to be studied:
    Offer
    Product
    Seller
    Geography
    Time
    Order
    Social Networks
Analysis of Offers
    Dimensions of Offers to be studied:
    Product
    Seller
    Length Granularity
    Geography
    Time
    Prosumer
    User Characteristics
Analysis of Product Mix
    Dimensions of Products to be studied:
    Offer
    Seller
    Prosumer
    User Characteristics
    Tier Costs
Analysis of Orders
    Dimensions of Orders to be studied:
    Prosumers
    User Characteristics
    Offer
    Sales Channels To provide additional detail with respect to prosumer marketing tools, it should be understood that such tools can be implemented as a web-based platform, which can be attached or accessed via the seller dashboard. Activation of these tools (e.g., through purchase) can enable another tab on the seller dashboard. One purpose of these tools in the platform can be to market specifically to prosumers, typically the most active and/or valuable buyers for any given seller.

As noted previously, these tools may not be available until the seller purchases access. In such cases, however, after payment processing these tools can be available in real time, which are described in more detail below:

The Seller can access an aggregate list of Prosumers segmented by offer.
    The Seller can also be able to see if any Prosumer is promoting multiple offers.
    The Seller can also be able to see Prosumers by past and present offers.
    The Seller can have access to an email engine through this platform.
    Email campaigns can be created in HTML or plain text.
    The Seller can save up multiple email templates.
    The Seller can schedule recurring email campaigns, meaning an email can be created one day and scheduled to be delivered on another day.
    The Seller can schedule by date and time.
    The Seller can send the emails to Prosumers from the aggregated list outlined above.
        Depending on privacy issues, this may be a blind email list, meaning the Seller will not see the names or email addresses of the Prosumers to which the campaigns are targeted.
        The Seller can select no less than one and no greater than all Prosumers on the list to be part of the campaign.
    The Seller can have access to a coupon engine through this platform.
    The Seller can set the amount of acceptable uses of the coupon—e.g., 11, 10, 25, 50, unlimited.
        This means the system can cookie the user based on the coupon code being used.
        An expiration date can be set for each coupon code.

Furthermore, in connection with other features discussed herein (e.g., seller interface component 210, prosumer interaction, etc.), prosumer tools can be segmented into at least four distinct categories, including by way of illustration: an email engine, coupon engine, aggregate prosumer database, and prosumer metrics, each of which is detailed herein.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A non-transitory computer readable storage medium having embodied thereon instructions executable by a processor to perform a method to present an offer for a good or service, the method comprising:
   identifying the location of both a user and a plurality of merchants associated with offers for one or more goods or services;
   selecting a plurality of offers based on the identified location of both the user and the plurality of merchants;
   identifying a profile of the user, wherein the profile is based upon recorded information about the user and the recorded information is based upon at least one connection with another member within a social network and feedback provided about a merchant by the member;
   presenting an offer to the user based on the identified profile of the user and from the plurality of offers based on the identified location of both the user and the plurality of merchants, wherein the offer presentation includes:
      member feedback related to at least one merchant from the plurality of merchants
      a map for a particular geographic area that identifies the location of a merchant for the offer,
      a retail list price of the good or service associated with the offer, and
      a time period associated with the offer, wherein a price paid for the good or service is discounted from the retail list price; and
   sharing the offer with one or more members of the social network, wherein at least one interaction between the one or more members of the social network is recorded, and the recording tracks a connection between the one or more members of the social network with respect to the offer.

2. The non-transitory computer readable storage medium of claim 1, wherein the instructions are further executable to accept an order for the offer from the user when the user accepts terms and conditions associated with the offer.

3. The non-transitory computer readable storage medium of claim 2, wherein the instructions are further executable to accept an order from one or more members of the social network and to record the connection among members of the social network.

4. The non-transitory computer readable storage medium of claim 3, wherein the connection is associated with the time that the offer was purchased, a geographic location of the user by way of a tracked mobile device, and a category associated with the offer.

5. The non-transitory computer readable storage medium of claim 3, wherein the connection is associated with a visual display that is represented as a table, chart, graph, tree, map, or color code.

6. The non-transitory computer readable storage medium of claim 3, wherein the connection includes a determination of further possible connections to members of the social network of the user that might purchase the offer.

7. The non-transitory computer readable storage medium of claim 6, wherein the instructions are further executable to identify the likelihood that one of the possible connections will purchase the offer.

8. The non-transitory computer readable storage medium of claim 7, wherein the likelihood is further associated with a degree of influence that one or more members of the social network have on the potential purchaser of the offer.

9. The non-transitory computer readable storage medium of claim 8, wherein the influence is visually displayed.

10. The non-transitory computer readable storage medium of claim 1, wherein the connection is associated with a degree of influence one member of the social network has with respect to another member of the social network and wherein the degree of influence is stored in at least one user profile.

11. The non-transitory computer readable storage medium of claim 1, wherein the member feedback includes a visual display of a time as to when the feedback was provided.

12. The non-transitory computer readable storage medium of claim 1, wherein the member feedback is a comment related to the offer.

13. The non-transitory computer readable storage medium of claim 1, wherein the member feedback is a comment related to the merchant associated with the offer.

14. The non-transitory computer readable storage medium of claim 1, wherein the recorded interaction is presented in the context of a table, chart, graph, tree, map, or color coded display.

15. The non-transitory computer readable storage medium of claim 14, wherein the presentation of the recorded interaction correlates to a purchase of the good or service.

16. The non-transitory computer readable storage medium of claim 15, wherein the interaction further correlates to a degree of influence that members in the social network have with regard to the purchase of the good or service.

17. The non-transitory computer readable storage medium of claim 1, wherein the profile of the user also includes demographic information, location, interests, preferences, and comments.

18. The non-transitory computer readable storage medium of claim 17, wherein the profile information of the connections of the user is used to influence at least one offer presented to the user.

19. The non-transitory computer readable storage medium of claim 17, wherein the profile information of connections of the user is used to influence at least one offer presented to at least one member of the social network.

20. The non-transitory computer readable storage medium of claim 17, wherein the sharing of the offer includes comments associated with the offer, an analysis of common profile information among the members, and a determination that other individuals who share the common profile information should be presented with the offer.

21. The non-transitory computer readable storage medium of claim 1, wherein the profile includes past purchases of the user.

22. The non-transitory computer readable storage medium of claim 1, wherein the profile includes past purchases among the members of the social network of the user.

23. A non-transitory computer readable storage medium having embodied thereon instructions executable by a processor to perform a method to present an offer for a good or service, the method comprising:
 identifying the location of both a user and a plurality of merchants associated with offers for one or more goods or services;
 selecting a plurality of offers based on the identified location of both the user and the plurality of merchants;
 identifying a profile of the user, wherein the profile is based upon recorded information about the user, and wherein the recorded information about the user is based upon at least one connection with another member within a social network and feedback provided about a merchant by the member;
 presenting an offer to the user based on the identified profile of the user and from the plurality of offers based on the identified location of both the user and the plurality of merchants, wherein the offer presentation includes:
  a map for a particular geographic area that identifies the location of a merchant for the offer;
  a retail list price of the good or service associated with the offer, and
  a time of expiration of the offer, and wherein a price paid for the good or service is discounted from the retail list price; and
 sharing the offer with one or more members of a social network, wherein:
  at least one interaction between the one or more members of the social network are recorded, the recording tracks a connection between the one or members of the social network with respect to the offer, the recorded interaction is presented in the context of a table, chart, graph, tree, map, or color coded display, the presentation of the recorded interaction correlates to a purchase of the good or service, and the interaction further correlates to influence of members in the social network with regard to the purchase of the good or service.

* * * * *